US011165622B2

(12) United States Patent
Ambeskar et al.

(10) Patent No.: US 11,165,622 B2
(45) Date of Patent: Nov. 2, 2021

(54) SYSTEM AND METHOD FOR LOW-RATE HIGH-RATE COUPLED ACQUISITION AND TRACKING OF HIGH SYMBOL RATE INROUTES

(71) Applicant: Hughes Network Systems, LLC, Germantown, MD (US)

(72) Inventors: Nimesh Prakash Ambeskar, Germantown, MD (US); Daniel Christopher Hantz, Montgomery Village, MD (US); Joyal Jose, New Market, MD (US)

(73) Assignee: Hughes Network Systems, LLC., Germantown, MD (US)

( * ) Notice: Subject to any disclaimer, the term of this patent is extended or adjusted under 35 U.S.C. 154(b) by 76 days.

(21) Appl. No.: 16/657,949

(22) Filed: Oct. 18, 2019

(65) Prior Publication Data
US 2021/0119842 A1    Apr. 22, 2021

(51) Int. Cl.
*H04L 27/26*    (2006.01)
(52) U.S. Cl.
CPC ........ *H04L 27/266* (2013.01); *H04L 27/2686* (2013.01)
(58) Field of Classification Search
CPC .......................... H04L 27/266; H04L 27/2668
USPC .......................................................... 375/326
See application file for complete search history.

(56) References Cited

U.S. PATENT DOCUMENTS 5,699,385 A * 12/1997 D'Sylva .............. H04L 27/2271
                                                          375/344
6,148,039 A * 11/2000 Coman ..................... H03D 7/16
                                                          331/17
2011/0299572 A1* 12/2011 Monsen ............. H04B 7/18513
                                                          375/214

FOREIGN PATENT DOCUMENTS

EP    0324420 A2    7/1989
EP    1196992 B1    4/2002

OTHER PUBLICATIONS

International Search Report and Written Opinion dated Feb. 24, 2021 by the International Searching Authority (European Patent Office) in PCT Application PCT/US2020/055918.

* cited by examiner

*Primary Examiner* — Kevin M Burd
(74) *Attorney, Agent, or Firm* — NovoTechIP International PLLC

(57) ABSTRACT

Systems and methods are described, and one method includes acquiring a frequency offset for a demodulator receiving one symbol rate in combination with acquiring another frequency offset for another demodulator, based on sweeping the other frequency offset until detecting a qualifying symbol pattern or acquiring the frequency offset for the demodulator receiving one symbol rate, whichever occurs first. Associated with acquiring the other frequency offset based on acquiring the frequency offset for the demodulator receiving one symbol rate, setting the other frequency offset includes adjusting the frequency offset for the demodulator receiving one symbol rate.

20 Claims, 12 Drawing Sheets

SYSTEM AND METHOD FOR LOW-RATE HIGH-RATE COUPLED ACQUISITION AND TRACKING OF HIGH SYMBOL RATE INROUTES

BACKGROUND

Satellite communication systems can include "outroute" channels extending from a satellite gateway and, via satellite, to customers' very small aperture terminals (VSAT) and "inroute" channels from the VSATs back, via the satellite, to the gateway. Outroute channels can be carried via forward uplinks from the satellite gateway up to the satellite and forward downlinks from the satellite to the VSATs. Inroute channels can be carried by reverse uplinks from the VSATs up to the satellite and inroute carriers from the satellite to the satellite gateway.

Functions of the satellite gateway relative to inroute channels include acquisition and tracking of the inroute carriers. Acquisition is required because the received inroute carriers can have a frequency offset exceeding the detection range of the gateway's return channel demodulators. Once locked onto the carrier, the demodulator can track the frequency error and make necessary adjustments.

Acquisition and tracking can include frequency estimation. The accuracy of frequency estimation, though, tends to decrease in relation to symbol rate, which has been increasing on inroute carriers. Frequency estimation errors can produce undesirable packet loss rate and resulting reduction in quality of service.

SUMMARY

This Summary identifies example features and aspects and is not an exclusive or exhaustive description of the disclosed subject matter. Whether features or aspects are included in or omitted from this Summary is not intended as indicative of relative importance of such features. Additional features and aspects are described, and others will become apparent to persons skilled in the art upon reading the following detailed description and viewing the drawings that form a part thereof.

An example of disclosed systems can include a first acquisition logic, which can be configured to acquire a first frequency offset for a first demodulator and correspondingly indicate a first acquisition lock, wherein acquiring the first frequency offset can include sweeping a value to the first demodulator for the first frequency offset and correspondingly monitoring an output of the first demodulator for detection of a qualifying first acquisition pattern, and in response to detecting the qualifying first acquisition pattern, to set a locked first frequency offset and indicate first acquisition lock; and can include a second acquisition logic, which can be configured to acquire a second frequency offset for a second demodulator, wherein acquiring the second frequency offset can include sweeping a value for the second frequency offset and correspondingly periodically monitoring an output of the second demodulator for detection of a qualifying second symbol pattern and, in response to a conjunction of the indication of first acquisition lock and not detecting the qualifying second acquisition pattern, to set a locked second frequency offset and indicate second acquisition lock; and can include a first tracking logic, which can be configured to periodically determine whether a first tracking condition is met by the output of the first demodulator and, based at least in part on the first tracking condition being met, to indicate first tracking lock and update the locked first frequency offset; and can include a second tracking logic, which can be configured to periodically determine whether a second tracking condition is met and, based at least in part on meeting the second tracking condition, to indicate second tracking lock and update the locked second frequency offset.

An example of disclosed methods can include acquiring a first frequency offset for a first demodulator, wherein acquiring the first frequency offset can include sweeping a value to the first demodulator for the first frequency offset, correspondingly monitoring an output of the first demodulator for a qualifying first acquisition pattern and, based at least in part of detecting the qualifying first acquisition pattern, to indicate first acquisition lock and set the first frequency offset, and can include acquiring a second frequency offset for a second demodulator, wherein acquiring the second frequency offset can include sweeping a value for the second frequency offset, correspondingly monitoring an output of the second demodulator for detection of a qualifying second symbol pattern and, in response to a conjunction of the indication of first acquisition lock and not detecting the qualifying second acquisition pattern, setting a locked second frequency offset and indicating second acquisition lock, and can include periodically determining whether a first tracking condition is met by the output of the first demodulator and, based at least in part on the first tracking condition being met, indicating first tracking lock and updating the locked first frequency offset; and can include periodically determining whether a second tracking condition is met and, based at least in part on meeting the second tracking condition, indicating second tracking lock and updating the locked second frequency offset.

Another example of disclosed systems can include a processor and a memory coupled to the processor, the memory storing executable instructions that, when executed by the processor, cause the processor to: acquire a first frequency offset for a first demodulator, acquire a first frequency offset the first frequency offset can include sweeping a value for a first frequency offset to the first demodulator, correspondingly monitoring an output of the first demodulator for a qualifying first acquisition pattern and, based at least in part on detecting the qualifying first acquisition pattern, to indicate first acquisition lock and set a locked first frequency offset; and can cause the processor to acquire a second frequency offset for a second demodulator, wherein acquiring the second frequency offset can include sweeping a value for a second frequency offset and correspondingly monitoring an output of the second demodulator for a qualifying second symbol pattern and, in response to a conjunction of the indication of first acquisition lock and not detecting the qualifying second acquisition pattern, to set a locked second frequency offset and indicate second acquisition lock; and to periodically determine whether a first tracking condition is met by the output of the first demodulator and, based at least in part on the first tracking condition being met, to indicate first tracking lock and update the locked first frequency offset; and can cause the processor to periodically determine whether a second tracking condition is met and, based at least in part on meeting the second tracking condition, to indicate second tracking lock and update the locked second frequency offset.

BRIEF DESCRIPTION OF THE DRAWINGS

The drawings and figures depict various implementations in accordance with the present teachings, by way of example only, not by way of limitation. In the figures, like reference numerals refer to the same or similar elements. For purposes of convenience the drawings are not necessarily made to scale.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, to avoid unnecessarily obscuring aspects of the present teachings.

Systems and methods according to the present disclosure enable and provide, among other features and benefits, productive, novel exploitation of certain demodulator characteristics. One is that performance of high symbol rate channels for example, and without limitation, 8 Msps and higher) is affected by large inaccuracies in the configured frequency of its numerically configured oscillator (NCO). Another is that performance of channels is affected by large inaccuracies in the configured frequency of its numerically configured oscillator (NCO). Another is that burst to burst frequency estimates of a high symbol rate channel (8 Msps) can have large inaccuracies (e.g., and without limitation, approximately 2 KHz). However, systems and methods according to the present disclosure can have a technical solution by producing and utilizing averages of the estimates from a large number of consecutive bursts from such channels. This, in turn, can provide features and benefits that can include, but are not limited to, computationally economical generation of frequency estimates with accuracy similar to burst to burst estimates of lower symbol rate channels.

Systems and methods according to the present disclosure can create two groups of channels, a first symbol rate group, which can have relatively lower symbol rates (for example, and without limitation, from 256 ksps to 6 Msps) and a second symbol rate group, which can have relatively higher symbol rates (for example, and without limitation, 8 Msps and above). Both the groups can maintain their own lock/unlock (sweeping/Lock) state. Applications can include providing each of a plurality of inroute demodulator controllers with the following set of possible functional states.

1. Low group "Sweeping" and high group "Sweeping".
2. Low group "Locked" and high group "Sweeping".
3. Low group "Sweeping" and high group "Locked".
4. Low Group "Locked" and high group "Locked"

It will be understood that the meaning of "burst" as used in this description encompasses, but is not limited to, a unit of VSAT signal transmission during an allocated period of time on a specific channel/frequency in a multiplexed, e.g., TDMA, system.

Figure 1:
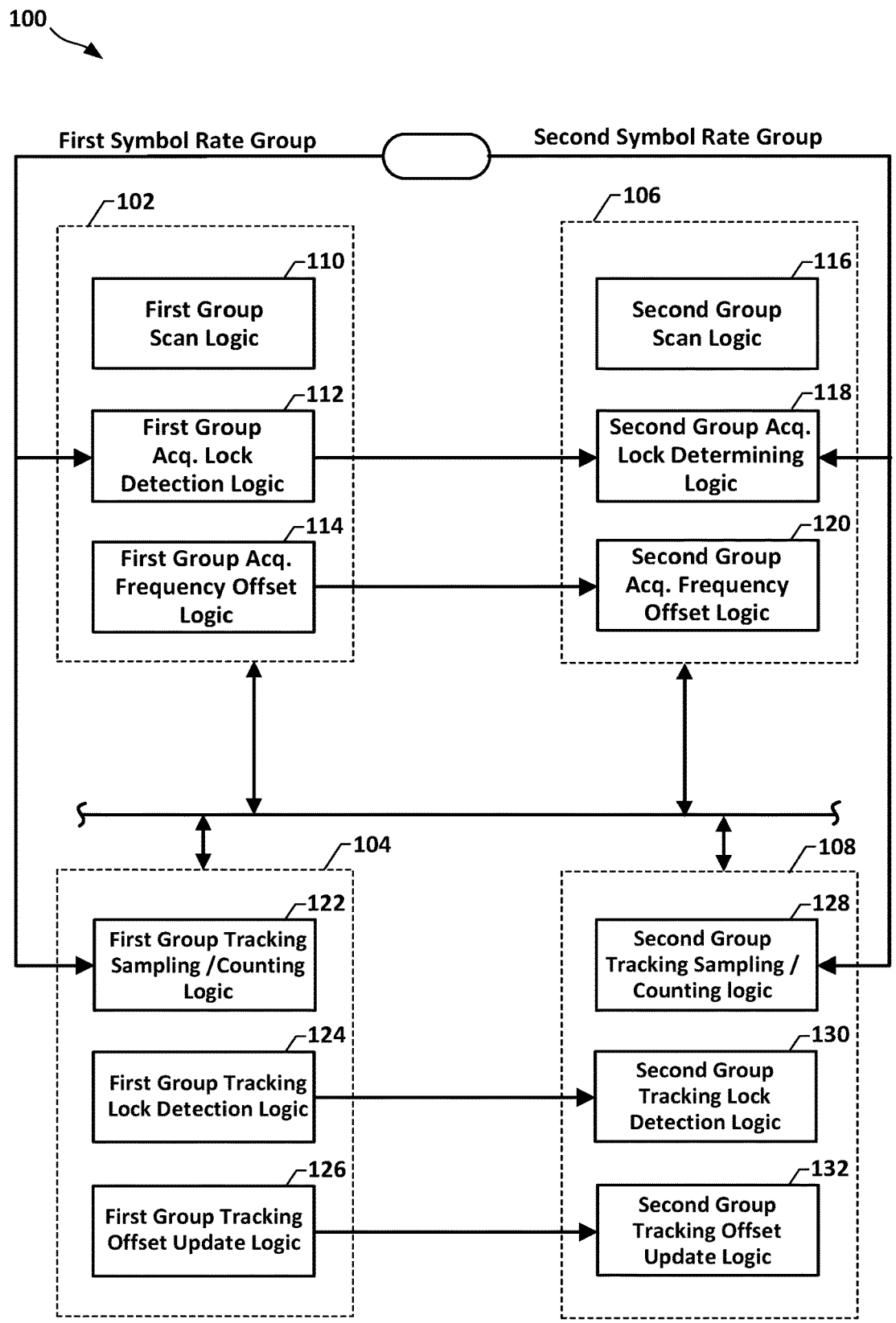
FIG. 1 is a logic schematic of an example implementation of a system of first group-second group coupled acquisition and offset tracking of high symbol rate inroutes in accordance with this disclosure.

FIG. 1 is a logic schematic of an example implementation of a system 100 for first group-second group coupled acquisition and offset tracking of high symbol rate inroutes in accordance with this disclosure.

The system 100 can include a first acquisition logic 102, a first tracking logic 104, a second acquisition logic 106, and a second tracking logic 108. The first acquisition logic can be configured such that, in response to events such as but not limited to system power up or reset, it can initialize a first frequency offset (FFO) to a first demodulator (not explicitly visible in FIG. 1) that is receiving the first group signal. The second acquisition logic 106 can likewise initialize a second frequency offset (SFO) to a second demodulator (not explicitly visible in FIG. 1) that is receiving the second group signal. In an implementation, the first tracking logic 104 and second tracking logic 108 can be inactive at this time.

The initial FFO generated by the first acquisition logic 102, in combination with the first demodulator's local oscillator frequency and the received first group signal carrier frequency, may be such that the received first group signal is not shifted to a frequency within the capture range of the first demodulator. In such a scenario, the first acquisition logic 102 may not detect the first group acquisition bursts. This can similarly occur because of the initial SFO generated by the second acquisition logic 106, in relation to the second demodulator's local oscillator frequency and the received second group signal carrier frequency.

Accordingly, the first acquisition logic 102 can be configured to respond to failure to detect the first acquisition bursts by proceeding to sweep the FFO, while monitoring the output of the first demodulator for first group acquisition bursts. In an example implementation, the first acquisition logic 102 can include a first sweep logic 110 configured to perform, without limitation, sweeping of the FFO. The first sweep logic 110 can be further configured to initialize the FFO to a first group start frequency and then incrementally increase, i.e., sweep, the FFO. The first acquisition logic 102 can also include, for monitoring the first demodulator output, a first acquisition lock detection logic 112. The first acquisition lock detection logic 112 can be configured to monitor the first demodulator output for the first group acquisition pattern, e.g., the first group acquisition burst during the sweeping of the FFO. The first acquisition logic 102 can also include a first FFO setting logic 114, which can be configured to set at least an initial value of the FFO, in response to the first acquisition lock detection logic 112 detecting the first group acquisition pattern, based on the FFO value corresponding to the detection.

Assuming the received first group signal has sufficient signal strength and signal-to-noise ratio (SNR), the first demodulator will output recovered logic first group acquisition bursts when the SFO shifts the first group signal to be within the first demodulator's capture range. In an implementation, the first acquisition lock detection logic 112 can be configured to include, in its monitoring the second demodulator output for first group acquisition bursts, a determination of whether the first group acquisition bursts meet acquisition criteria (not explicitly visible in FIG. 1). It is contemplated that particular criteria for first group acquisition may differ from such criteria for second group acquisition and vice a versa. Therefore, criteria for the first acquisition logic 102 to qualify demodulated first group acquisition bursts will be referenced as "first group acquisition criteria," and criteria for qualifying later described recovered second group acquisition bursts will be referenced as "second group acquisition criteria."

The first acquisition logic 102 can be configured such that its detection of the first group acquisition bursts can be sufficient for it to declare or indicate first acquisition lock.

The first group signals can carry, in addition to payload information, symbol bursts that can be used for of acquisition, i.e., locking to the carrier frequency of the first group signal. The second group signal can carry similar symbol bursts. For convenience, the former bursts will be referenced as "first group acquisition bursts," and the latter as "second group acquisition bursts."

The second acquisition logic 106 can include a second sweep logic 116, second acquisition lock determination logic 118, and second offset computation logic 120. The second sweep logic 116 can be configured to initialize the SFO to a second group start frequency and then incrementally increase, i.e., sweep, the SFO. During the sweep, functionality of the second acquisition lock determination logic 118 can include, but is not limited to, monitoring the second demodulator output for the second group acquisition pattern. The second group acquisition pattern can be, for example, a second group symbol burst that meets a given qualification criteria, e.g., a requisite number of consecutive symbols. To distinguish from the above-described first group acquisition burst, this burst will be referenced as the "second group acquisition burst."

The second acquisition lock determination logic 118 can be configured to also receive, e.g., from the first acquisition lock detection logic 112, the declaration of first group acquisition lock and, in an aspect, to declare second group acquisition based on a condition that can be modeled, for example, as a logical OR of that declaration of first group acquisition lock with detection of the second group acquisition burst. Stated differently, the second acquisition lock determination logic 118 detects a "second group acquisition event," and that event can be detection of the second group acquisition burst or the declaration of first group acquisition lock, whichever occurs first.

It will be understood that if the received first group signal has insufficient signal power or SNR, the first acquisition logic 102 may fail to detect the first acquisition group, regardless of the locked FFO placing the first group signal within the first demodulator capture range. Likewise, if the received signal power or SNR of the second group signal is insufficient, the second acquisition logic 106 may fail to detect the second acquisition group, regardless of the locked SFO putting the second group signal within the second demodulator capture range. To significantly reduce such instances, additional and alternative implementations described in greater detail later in this disclosure can include automatic gain control (AGC). The AGC features can boost the first group signal and/or the second group signal such that when FFO and SFO are swept to their necessary values, the first group acquisition bursts and second group acquisition bursts can be recovered. In following descriptions of example implementations, features, and aspects, absence of explicit reference to AGC is not to be understood as AGC being necessarily absent.

Referring to FIG. 1, the first tracking logic 104 can be configured to periodically determine whether a first tracking condition is met by the output of the first demodulator. Specific periodicity can be application-specific and can be readily determined by persons of ordinary skill having possession of this disclosure and facing such an application. For the first tracking logic 104 to detect the first tracking condition the first group signal can carry, as or in addition to payload information, symbol bursts. These can be referred to as "first group tracking bursts."

The first tracking logic 104 can include first symbol group tracking sampling/counting logic 122, first symbol group tracking lock detection logic 124, and first symbol group tracking offset updating logic 126. The second tracking logic 108 can include second symbol group tracking sampling/counting logic 128, second symbol group tracking lock detection logic 130, second symbol group tracking offset update logic 132. In an aspect, each of the logics 102, 104, 106, and 108 can include a respective automatic gain control (AGC) logic, as described in greater detail later.

In an implementation, the system 100 can include a state logic (not separately visible in FIG. 1), which can be configured to switch component logic resources 102, 104, 106, and 108 to attain any among a plurality of "sweep-lock" states. FIGS. 2A-2D show four examples of such states, each corresponding to one among the first acquisition logic 102 and first tracking logic 104 being active, in combination with one among the second acquisition logic 106 and second tracking logic 108 being active, with activity graphically indicated by no hatching and inactivity indicated by cross-hatching. The switching between sweep-lock states can correspond to acquisition and loss of first group lock and acquisition and loss of second group lock.

One example state, which can be arbitrarily labeled a first state, can be defined as a first group sweeping-second group sweeping state. Referenced to the FIG. 1 system 100, one example can include the first acquisition logic 102 active, the first sweep logic 110, sweeping the value of the FFO while first acquisition lock detection logic 112 monitors the first demodulator output for first acquisition symbol bursts, absent indication of first acquisition lock, in combination with the second acquisition logic 106 being active, e.g., the second sweep logic 116, sweeping the value of the SFO while second acquisition determination logic 118 monitors the second demodulator output for second acquisition symbol bursts. The first, or first group sweeping-second group sweeping state can be switched to, for example, in association with a reset of system 100, or a suitably extended loss of both the first group and second group inroutes.

Figure 2A:
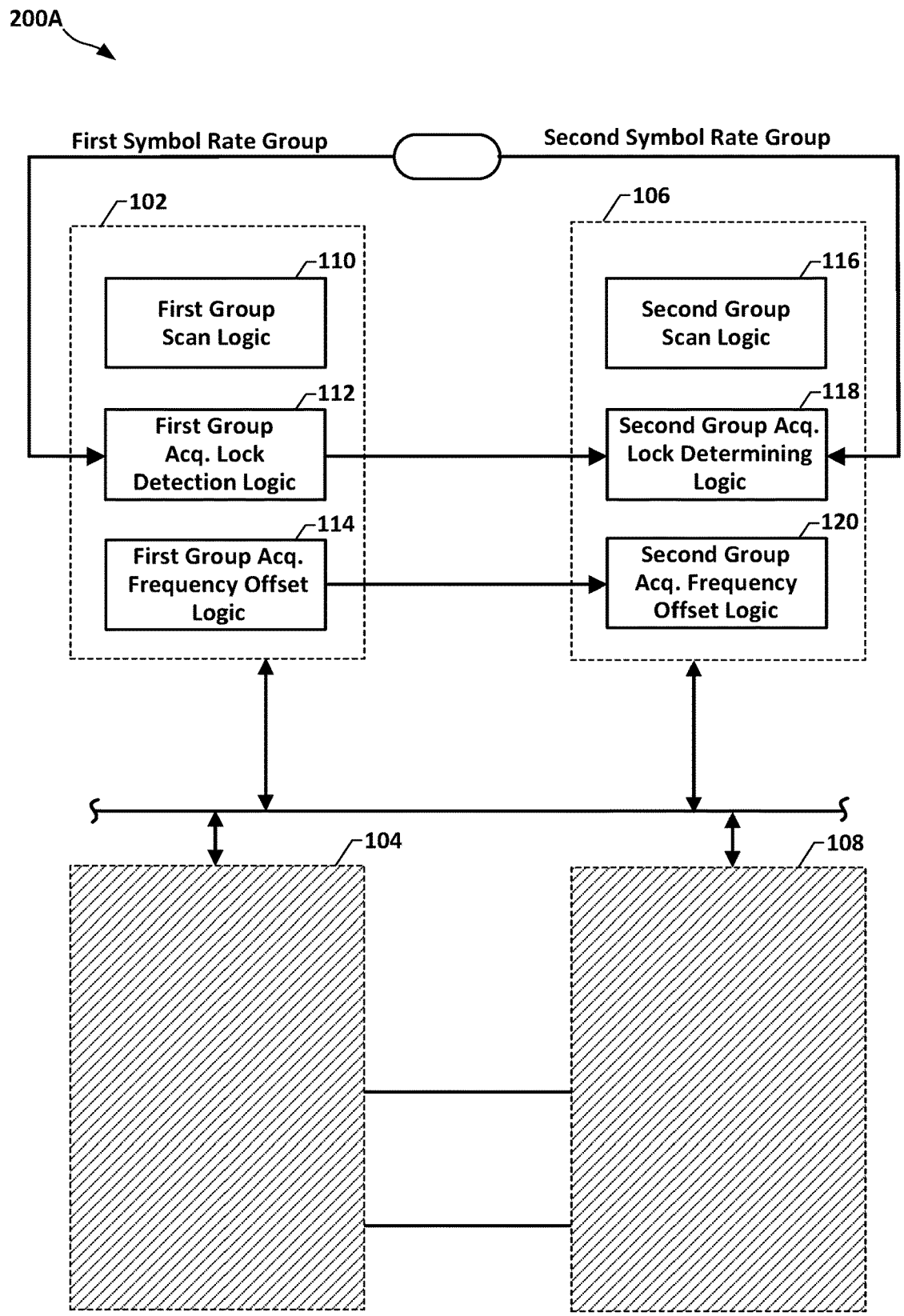
FIG. 2A shows the FIG. 1 logic schematic with graphical indication of active and non-active blocks in association with a first group sweep/second group sweep state, for first group-second group coupled acquisition and offset tracking of high symbol rate inroutes in accordance with this disclosure.
Figure 2B:
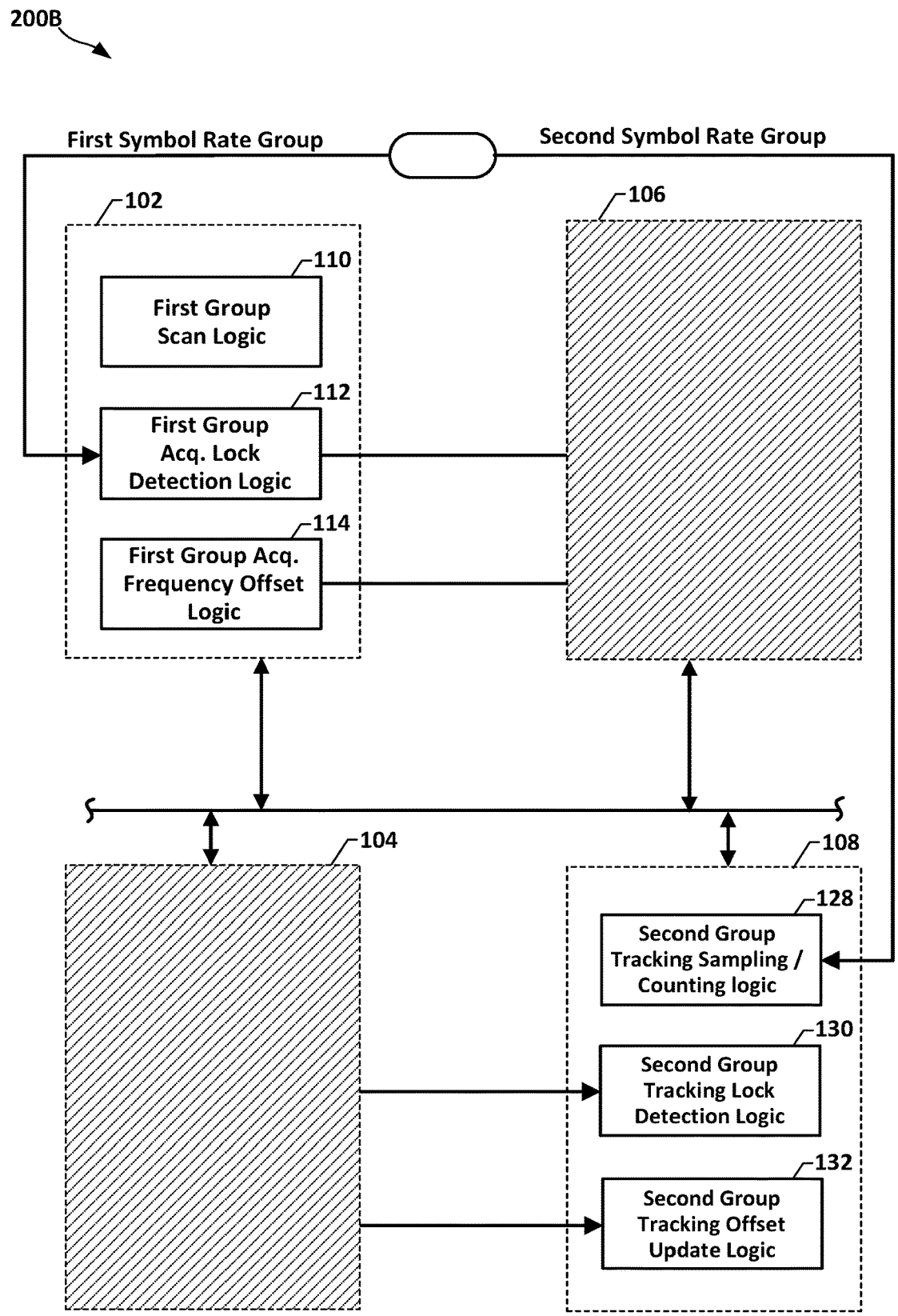
FIG. 2B shows the FIG. 1 logic schematic with graphical indication of active and non-active blocks in association with a first group sweep/second group lock state, for first group-second group coupled acquisition and offset tracking of high symbol rate inroutes in accordance with this disclosure.

Another of the sweep-lock states can be referenced, for example, as a second or "first group sweeping-second group locked" state. Referring to FIG. 1, an example of such a second state can include the second acquisition logic 106 having indicated second acquisition lock, and having provided the locked SFO to the second demodulator, causing the second tracking logic 108 to become active to track the SFO, while the first acquisition logic 102 continues to sweep. An example state history for reaching the second or first group sweeping-second group locked state can include the above-described events causing a switching to the first sweep-lock state, followed by the second acquisition logic 106 acquiring the second acquisition lock prior to the first logic 102 acquiring first acquisition lock. Another example can be a loss of first acquisition lock after being in a fourth, or "first group locked-second group locked" state described in greater detail in subsequent paragraphs. FIG. 2B shows a graphical representation of the FIG. 1 system 100 in the example second, or first group sweeping-second group locked" state.

Figure 2C:
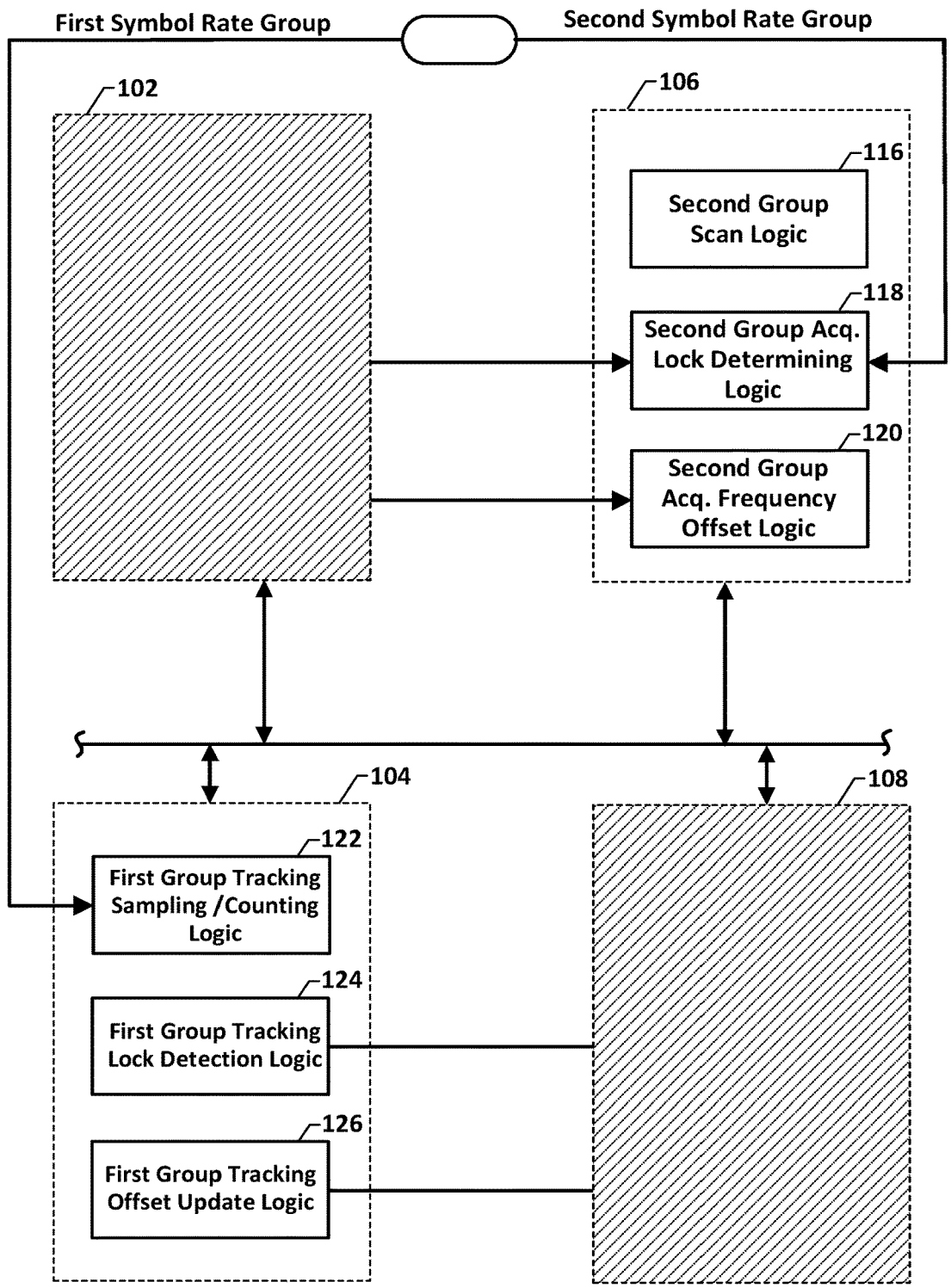
FIG. 2C shows the FIG. 1 logic schematic with graphical indication of active and non-active blocks in association with a first group lock/second group sweep state, for first group-second group coupled acquisition and offset tracking of high symbol rate inroutes in accordance with this disclosure.

Another of the sweep-lock states can be referenced, for example, as a third or "first group locked-second group sweeping" state. Referring to FIG. 1, an example can include the first acquisition logic 102 having acquired first acquisition lock indicated first acquisition lock, causing the first tracking logic 104 to become active and track the FFO, while the second acquisition logic 106 continues to sweep. FIG. 2C shows a graphical representation of the FIG. 1 system 100 in this example third, or first group locked-second group sweeping state. An example state history for reaching this third sweep-lock state can include the above-described events causing a switching to the first sweep-lock state, followed by the first acquisition logic 102 acquiring the first acquisition lock prior to the second acquisition logic 106 acquiring second acquisition lock. It will be understood that, referenced to the FIG. 1 system 100, the third sweep-lock state can be transitory, as the described configuration of the second acquisition determination logic 118 provides automatic acquisition of second acquisition lock in response to the first logic 102 acquiring first acquisition lock.

Figure 2D:
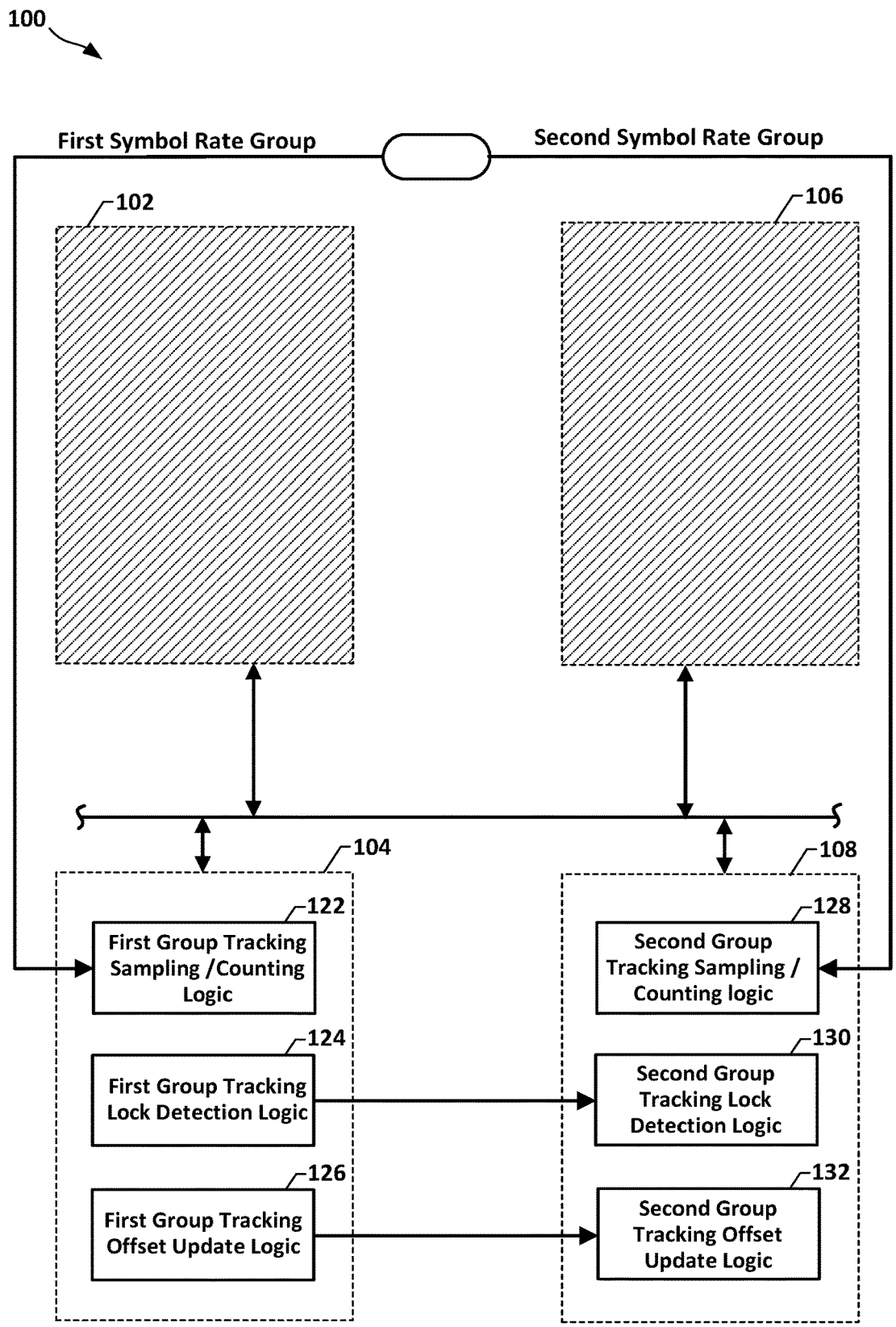
FIG. 2D shows the FIG. 1 logic schematic with graphical indication of active and non-active blocks in association with a first group lock/second group lock state, for first group-second group coupled acquisition and offset tracking of high symbol rate inroutes in accordance with this disclosure.

Another sweep-lock state can be referenced, for example, as a fourth or "first group locked-second group locked" state. Referring to FIG. 1, an example of such a state can include the first acquisition logic 102 having acquired first acquisition lock, provided the locked FFO to the first demodulator, causing the first tracking logic 104 to track the FFO, in combination with the second acquisition logic 106 having likewise acquired second acquisition lock, provided the locked SFO to the second demodulator, causing the second tracking logic 108 to track the SFO. FIG. 2D shows a graphical representation of the FIG. 1 system 100 in this example fourth, or first group locked-second group locked state. One state history for reaching the fourth sweep-lock state can be the above-described switching from the first state to the transitory third state, followed by the automatic switching from the third state to the fourth state.

Figure 3:
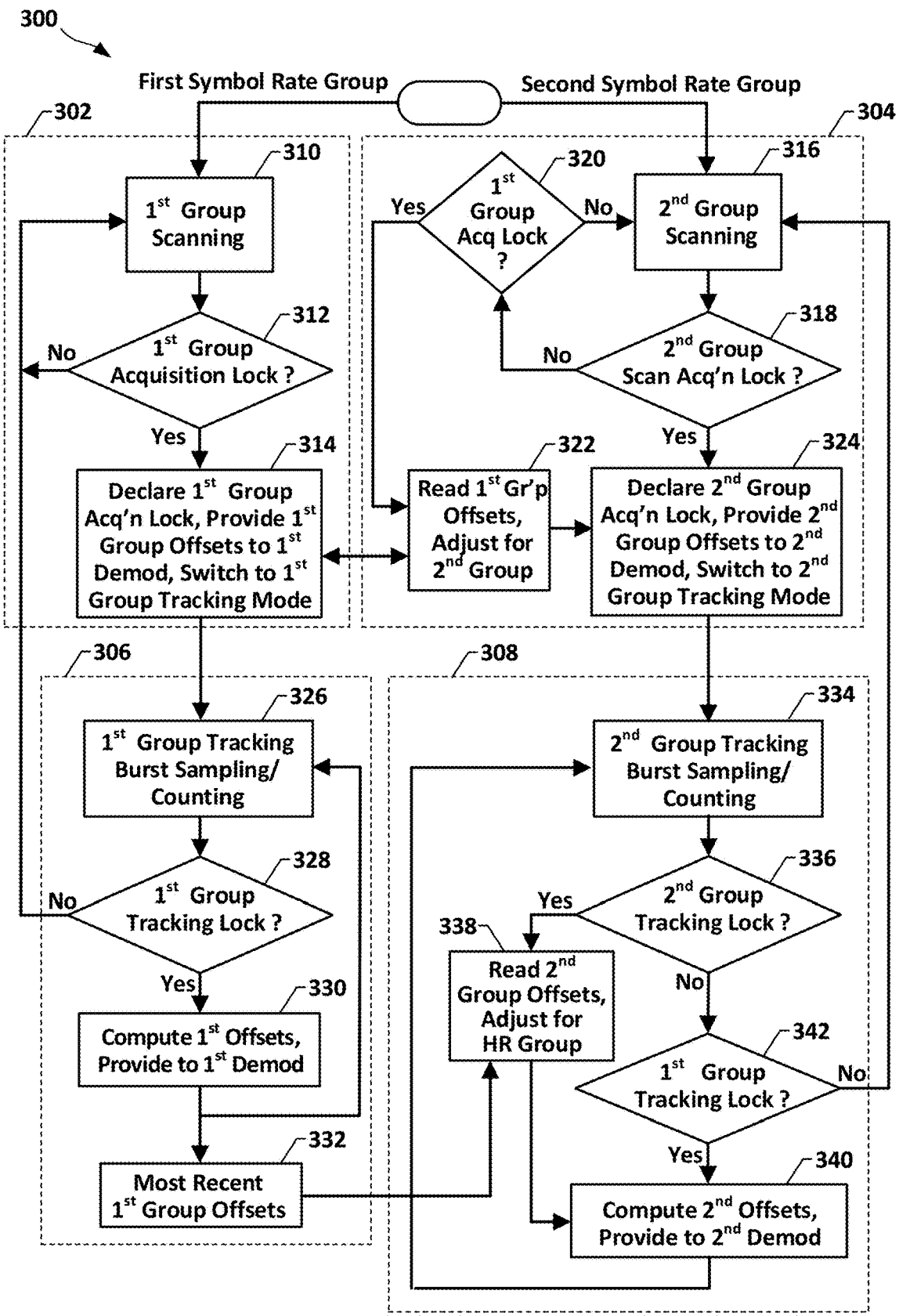
FIG. 3 is a logic flow diagram of example operations in an implementation of a process in first group-second group coupled acquisition and offset tracking of high symbol rate inroutes in accordance with this disclosure.

FIG. 3 is a logic diagram of a flow 300 example operations in a process in first group-second group coupled acquisition and offset tracking of high symbol rate inroutes in accordance with this disclosure. The flow 300 includes four component flows, which are first group acquisition flow 302, second group acquisition flow 304, first group tracking flow 306, and second group tracking flow 308. Description of an example instance according to the flow 300 will assume starting from the above-described first group sweeping-second group sweeping state, such as shown in FIG. 2A, e.g., after system reset or extended loss of first and second inroute. Accordingly, as indicated by FIG. 2A, for an interval subsequent to start only flows 302 and 304 will be active. Description will address the first group acquisition flow 302 and the second group acquisition flow 304 in sequence. It will be understood, though, that various operations in the flows 302 and 304 can have mutual overlap with respect to time.

An example instance of the first group acquisition flow 302 can begin at 310 where operations can be applied to initialize the FFO to the first demodulator and then sweep FFO. In an aspect, in association with the sweeping of FFO, operations at 312 can monitor the first demodulator output to determine when and if the sweep produces first group acquisition lock. As described above, operations at 312 can include detection of the first acquisition burst, for example, by the first acquisition lock detection logic 112. In an implementation, FIG. 3 blocks 310 and 312 can be performed as a loop, each including an increment of FFO at 310, followed by a detection of result at 312. In response to detection of first group acquisition at 312, the flow 302 can proceed to 314 where operations can include declaration of first group acquisition lock, providing the locked FFO to the first demodulator, and causing activation of the first group tracking flow 306.

Assuming detection of first group acquisition at 312 occurs before detection of second group acquisition by flow 304, the 312 detection can shift the system 100 from the FIG. 2A first group sweeping-second group sweeping state to the FIG. 2C state of first group locked-second group sweeping. Referring to FIGS. 1 and 3, operations at 314 can also include providing the first group acquisition lock indication (FLI) to the second acquisition logic 106. As described in greater detail in reference to FIG. 3 flow 304, if the flow 304 is active, i.e., second group sweeping is still ongoing, FLI can override the flow 304 and impose second group acquisition, in turn activating the second group tracking flow 308. Accordingly, the above-described detection at 312 of the first acquisition lock will ultimately drive the FIG. 1 system 100 to the FIG. 2D first group locked-second group locked state.

An example instance of the second group acquisition flow 304 can begin at 316 where operations can initialize the SFO to the second demodulator and then sweep SFO. Associated with the sweeping of SFO, operations at 318 can monitor the second demodulator output to determine when and if the sweep produces second group acquisition lock. As described above in reference to FIG. 1 logic 118, operations at 318 can include detection of the second acquisition burst. If the answer at 318 is "No," the flow 304 can proceed to 320, from which the flow path will depend on whether or not the first group acquisition flow 302 has acquired first group acquisition lock. It will be assumed that in this first iteration of block 316 to 318 to 320, operations at 320 do not detect first acquisition lock. Accordingly, in this iteration, the flow 304 can proceed from 320 back to 316.

It will be also be assumed that during a time interval to a next iteration, flow 302 has acquired first acquisition lock (therefore setting FLI to logic 1), while the current sweep setting of SFO still does not place the second group signal within the second demodulator capture range. Accordingly, in this next iteration of the flow 300, operation at block 318 causes exit from its "No" outbranch and procession to the decision block 320. Since FLI is now at logic 1 the flow 304 can exit the "Yes" outbranch of block 320 and proceed to 322. At 322 operations can include obtaining or reading the locked FFO generated, e.g., in the flow 302 block 314, and adjusting the received FFO to be usable as a starting SFO by the second demodulator. The flow 304 can proceed from 322 to 324, where operations can include declaration of second group acquisition lock, providing the locked SFO to the second demodulator, and causing activation of the second group tracking flow 308.

Upon the system 100 being driven to the FIG. 2D first group locked-second group locked state, the first group tracking flow 306 and the second group tracking flow 308 can be performed in an overlapping manner. For convenience, though, description will address the first group tracking flow 306 and the second group tracking flow 308 in sequence.

An example instance of the first group tracking flow 306 can begin at 326 where operations can include collecting a first demodulator output samples, for example, in accordance with defined sampling parameters. To distinguish from such parameters that apply in operations in the second group tracking flow 308, the 326 parameters will be referred to as "first tracking sampling parameters" (not explicitly visible in FIG. 3).

The flow 306 can proceed from 326 to 328 where operations can be applied to determine whether the samples indicate first group acquisition lock, or loss of first group tracking lock. Such operations can include, for example, determining whether the samples show recovery of first group tracking bursts that meet given criteria. To distinguish from such criteria that apply in operations in the second group tracking flow 308, the 306 criteria will be referred to as "first tracking lock criteria" (not explicitly visible in FIG. 3). Assuming operations at 328 indicate first group acquisition lock, the flow 306 can proceed from 328 to 330, where operations can compute first group updated offsets, e.g., updated FFO, and provide the updates to the first demodulator. The flow 306 can then proceed from 330 back to 326 and as a side operation can at 332 store, in a location accessible to flow 308, the most recent updated first group offsets, e.g., most recent updated FFO.

In an implementation, operations in the flow 306 can include, e.g., in association with operations at 328, operations of determining whether the samples indicate loss of first group acquisition lock. Examples of operations that can be applied at 328 for determining loss of first group acquisition lock are described in greater detail in later paragraphs. Assuming, for purposes of example, that loss detection operations at 328 indicate loss of first group acquisition lock, the flow 300 can proceed from 328 to block 310 of the first group acquisition flow 302, and correspondingly, can reset FLI to logic 0.

An example instance of the second group tracking flow 308 can begin at 334 where operations can include collecting second demodulator output samples and determining certain parameters, e.g., burst counting parameters. The 334 parameters will be referred to as "second tracking sampling parameters" (not explicitly visible in FIG. 3). In an aspect, flow 308 can proceed from 334 to 336 where, instead of immediately determining whether the sampling at 334 indicates second group acquisition lock, operations can determine whether the first group tracking flow 306 indicates presence or absence of first group acquisition lock. In an aspect, if the answer at 336 is "Yes," the flow 308 can proceed to 338 where operations can read or otherwise obtain the most recent first group offsets, e.g., most recent FFO stored at 332. Operations at 338 can also include adjusting the most recent FFO obtained at 338 in order to be usable by the second group tracking flow 308. The flow 308 can then proceed to 340 where operations can compute second group updated offsets, e.g., updated SFO, and provide the updates to the second demodulator. The flow 308 can then proceed from 340 back to 334 and repeat the above-described flow 308.

If the answer at 336 is "No," i.e., the first group tracking flow 306 has lost the first acquisition lock, the flow 308 can proceed from 336 to 338 where operations can determine whether the second demodulator samples obtained at 334 can read or otherwise obtain or be effectuate receipt of the most recent first group offsets, e.g., most recent FFO stored at 332. Operations at 338 can also include adjusting the most recent FFO obtained at 338, in order to be usable by the second group tracking flow 308. The flow 308 can then proceed to where operations can compute second group updated offsets, e.g., updated SFO, and provide the updates to the second demodulator. The flow 308 can then proceed from 340 back to 334 and repeat the above-described flow from 334 to 336 and, assuming first group acquisition lock, from 336 to 338 to 340 and back to 334.

Figure 4:
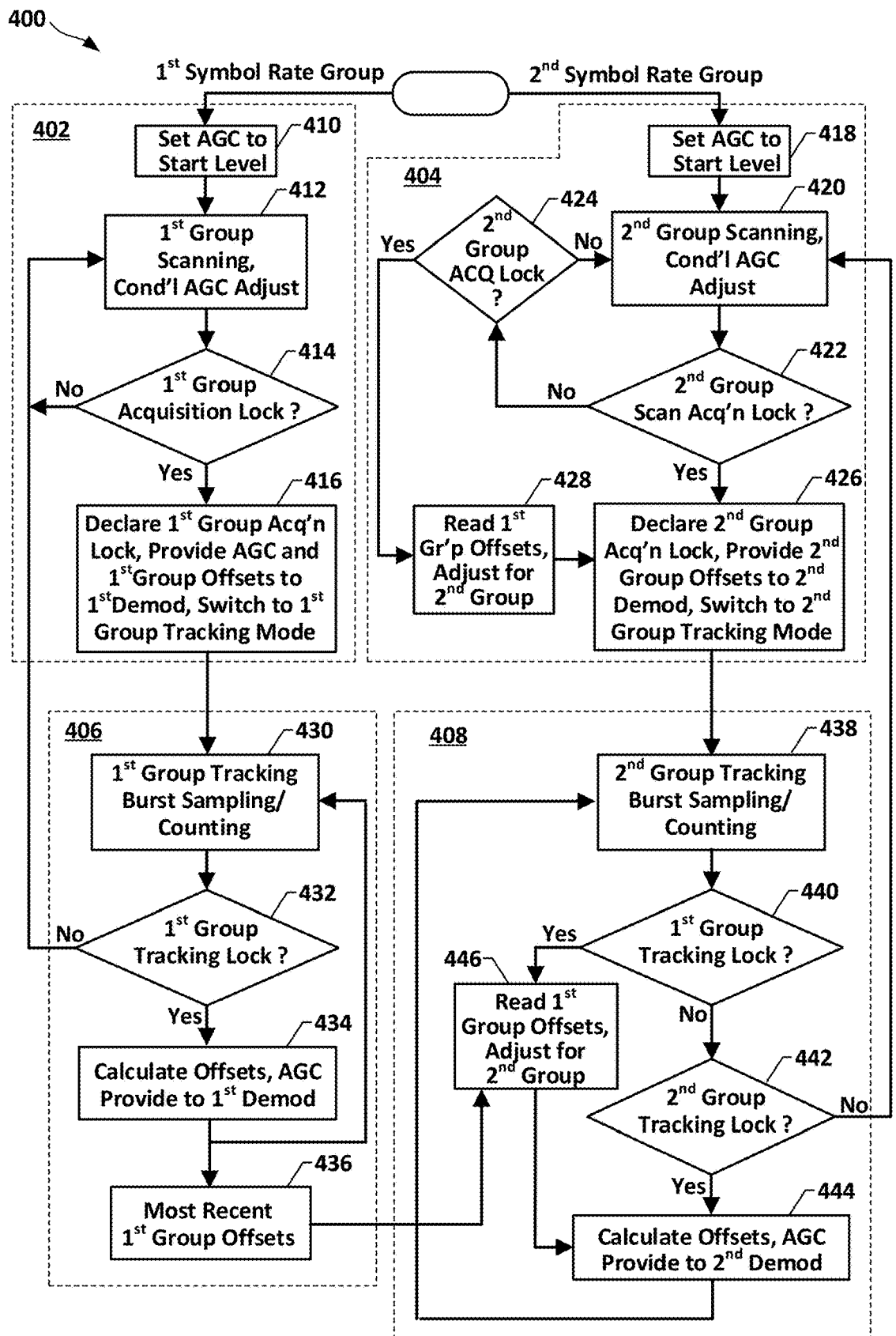
FIG. 4 is a logic flow diagram of example operations in an implementation of a process in an automatic gain controlled (AG Controlled) first group-second group coupled acquisition and offset tracking of high symbol rate inroutes in accordance with this disclosure.

FIG. 4 is a logic diagram of a flow 400 of example operations in a process in AGC controlled first group-second group coupled acquisition and offset tracking of high symbol rate inroutes. The flow 400 includes AGC controlled first group acquisition flow 402 (hereinafter also referred to as "flow portion 402"), AGC controlled second group acquisition flow 404 (hereinafter also referred to as "flow portion 404"), AGC controlled first group tracking flow 406 (hereinafter also referred to as "flow portion 406"), and AGC controlled second group tracking flow 408 (hereinafter also referred to as "flow portion 408"). Description of an example instance according to the flow 400 will assume starting from first group sweeping-second group sweeping state, such as shown in FIG. 2A, e.g., after system reset or extended loss of first and second inroute. Accordingly, as indicated by FIG. 2A, for an interval subsequent to start, only first group AGC controlled acquisition flow 402 and second group AGC controlled acquisition flow 404 will be active. Description will address the AGC controlled first group acquisition flow 402 and the AGC controlled second group acquisition flow 404 in sequence. It will be understood, though, that various operations in the flows 402 and 404 can have mutual overlap with respect to time.

An example instance of the AGC controlled first group acquisition flow 402 can begin at 410 where operations can set the first group AGC to a starting level, and then can proceed to 412 where first group sweeping and first group conditional AGC update operations can be applied. First group sweeping operations at 412 can include initializing the FFO to the first demodulator and then sweeping FFO. In association with the sweeping of FFO, operations at 414 can monitor the first demodulator output to determine when and if the sweep produces first group acquisition lock. Operations at 414 can include detection of the first acquisition burst, for example, by the first acquisition lock detection logic 112. In an example implementation, blocks 412 and 414 can be performed as a loop, each including an increment of FFO at 412, followed by a detection of result at 414.

Referring to block 412, first group conditional AGC update operations can include initializing the first group AGC to a starting AGC level, then maintaining that starting AGC level throughout a first sweeping of the FFO. In other words, if a sweep of FFO from its starting frequency to its ending frequency includes N increments, the first N-increment sweep maintains the starting AGC level over the entire N increments. The AGC is then increased by a step, and the sweep is repeated. In response to detection of first group acquisition at 414, the flow portion 402 can proceed to 416, where operations can declare first group acquisition lock, provide the locked FFO to the first demodulator, and cause activation of the AGC controlled first group tracking flow 406. If detection of the first group acquisition at 414 occurs before detection of second group acquisition by flow portion 404, the system 100 can shift from the FIG. 2A first group sweeping-second group sweeping state to the FIG. 2C state of first group locked-second group sweeping. Referring to FIGS. 1 and 4, operations at 416 can also include providing the first group acquisition lock indication (FLI) to the second acquisition logic 106. Therefore, if the AGC controlled flow 404 is active, e.g., second group sweeping is still ongoing, FLI can cause decision block 424 to override the AGC flow 404 and impose second group acquisition, in turn activating the AGC second group tracking flow 408. Therefore, the above-described detection at 414 of the first acquisition lock will ultimately drive the FIG. 1 system 100 to the FIG. 2D first group locked-second group locked state.

An instance of the AGC second group acquisition flow 404 can begin at 418 where operations can initialize second group AGC to a starting level, then proceed to 420, where second group sweeping and second group conditional AGC adjust operations can be applied. Associated with the sweeping of SFO, operations at 422 can monitor the second demodulator output to determine when and if the sweep produces second group acquisition lock. As described above in reference to FIG. 1 logic 118, operations at 422 can include detection of the second acquisition burst. If the answer at 422 is "No," the AGC controlled flow 404 can proceed to 424. The flow from 424 can depend on whether or not the AGC controlled first group acquisition flow 402 has acquired first group acquisition lock. It will be assumed that in this first iteration of block 420 to 422 to 424 that operations at 422 do not detect first acquisition lock. Accordingly, in this iteration the AGC second group acquisition flow 404 can proceed from 424 back to 420.

It will be also be assumed that during a time interval to a next iteration, the AGC controlled first group acquisition flow 402 has acquired first acquisition lock (therefore setting FLI to logic 1), and that the current sweep setting of SFO still does not place the second group signal within the second demodulator capture range. Accordingly, in this next iteration of the AGC controlled flow 404, operation at block 422 causes exit from its "No" outbranch and procession to the decision block 424. Since FLI is now at logic 1 the flow 404 can exit the "Yes" outbranch of block 424 and proceed to 428. At 428 operations can include obtaining or reading the locked FFO generated, e.g., in the AGC first group acquisition flow 402 block 416 and adjusting the received FFO to be usable as a starting SFO by the second demodulator. The flow portion 404 can proceed from 428 to 426, where operations can include declaration of second group acquisition lock, providing the locked SFO to the second demodulator, and causing activation of the AGC second group tracking flow 408.

Upon the system 100 being driven to the FIG. 2D first group locked-second group locked state, the AGC first group tracking flow 406 and the AGC second group tracking flow 408 can be performed in an overlapping manner. For convenience, though, description will address the AGC controlled first group tracking flow 406 and the AGC controlled second group tracking flow 408 in sequence.

An example instance of the AGC first group tracking flow 406 can begin at 430 where operations can include collecting first demodulator output samples, for example, in accordance with defined sampling parameters, and applying certain burst sampling and counting operations. The AGC controlled first group acquisition flow 406 can proceed from 430 to 432 where operations can be applied to determine whether the samples indicate first group acquisition lock, or loss of first group tracking lock. Such operations can include, for example, determining whether the samples show recovery of first group tracking bursts that meet given criteria. Assuming operations at 432 indicate first group acquisition lock is maintained, the flow portion 406 can proceed from 432 to 434, where operations can compute first group updated offsets, e.g., updated FFO, provide the updates to the first demodulator, and compute updated AGC level. The AGC controlled first group tracking flow 406 can then proceed from 434 back to 430 and as a side operation can at 436 store, in a location accessible to flow portion 408, the most recent updated first group offsets, e.g., most recent updated FFO.

Operations in the AGC controlled first group tracking flow 406 can include, e.g., in association with operations at 432 of determining whether the samples and parameters from 430 indicate first group acquisition lock, operations of determining whether the samples and parameters indicate loss of first group acquisition lock. Examples operations that can be applied at 432 for determining loss of first group acquisition lock are described in greater detail in later paragraphs. Assuming, for purposes of example, that loss detection operations at 432 indicate loss of first group acquisition lock, the AGC first group tracking flow 406 can proceed from 432 to block 412 of the AGC first group acquisition flow 402. Associated with the flow from 432 to 412, operations (not explicitly visible in FIG. 4) can reset FLI to logic 0.

An example instance of the AGC controlled second group tracking flow 408 can begin at 438 where operations can include collecting second demodulator output samples and deriving or extracting certain parameters, e.g., burst counting parameters. To distinguish earlier defined "first tracking sampling parameters" that apply in operations in the AGC controlled first group tracking flow 406, the 438 parameters will be referred to as "second tracking sampling parameters" (not explicitly visible in FIG. 4). In an aspect, AGC flow 408 can proceed from 438 to 440 where, instead of immediately determining whether the sampling at 438 indicates second group acquisition lock, operations can determine whether the AGC first group tracking flow 406 indicates presence or absence of first group acquisition lock. In an implementation, if the answer at 438 is "yes," the AGC flow 408 can proceed to 446 where operations can read or otherwise obtain the most recent first group offsets, e.g., most recent FFO stored at 436.

Operations at 446 can also include adjusting the most recent FFO values, in order to be usable by the AGC controlled second group tracking flow 408. The AGC flow 408 can then proceed to 444 where operations can compute second group updated offsets, e.g., updated SFO, and provide the updates to the second demodulator. The AGC controlled second group tracking flow 408 can then proceed back to 438. If the answer at 440 is "No," i.e., the AGC controlled first group tracking flow 406 has lost the first group acquisition lock, the AGC second group tracking flow 408 can proceed from 440 to 442 where operations can determine whether the second demodulator samples obtained at 438 meet criteria establishing second group acquisition lock. If the answer at 442 is "Yes," the AGC second group tracking flow 408 can proceed to 444 where operations can compute second group updated offsets, e.g., updated SFO, and provide the updates to the second demodulator. The flow 408 can then proceed from 444 back to 438 and repeat the above-described flow from 438 to 440 and, assuming first group acquisition lock, from 440 to 446 to 444 and back to 438. If the answer at 440 is "No," the AGC second group tracking flow 408 can proceed from 442 to block 420 of the AGC controlled second group acquisition flow 404, in addition to indicating loss of first group acquisition lock and correspondingly setting FLI to logical 0.

Figure 5:
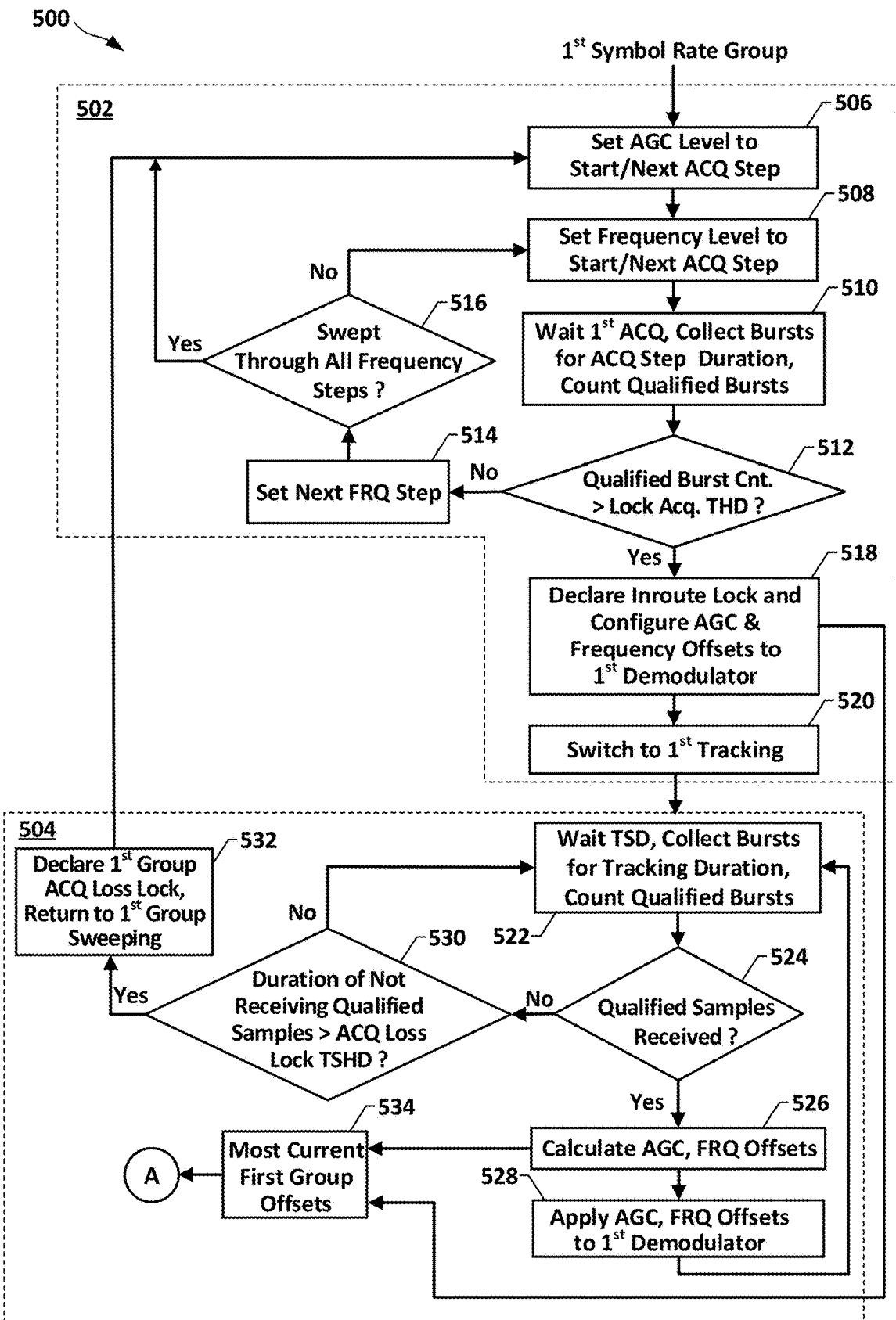
FIG. 5 is a logic flow diagram of example operations in a process of first group acquisition and offset tracking, further providing a coupling to one or more processes in second group acquisition and offset tracking, in AGC controlled first group-second group coupled acquisition and offset tracking of high symbol rate inroutes in accordance with this disclosure.
Figure 6:
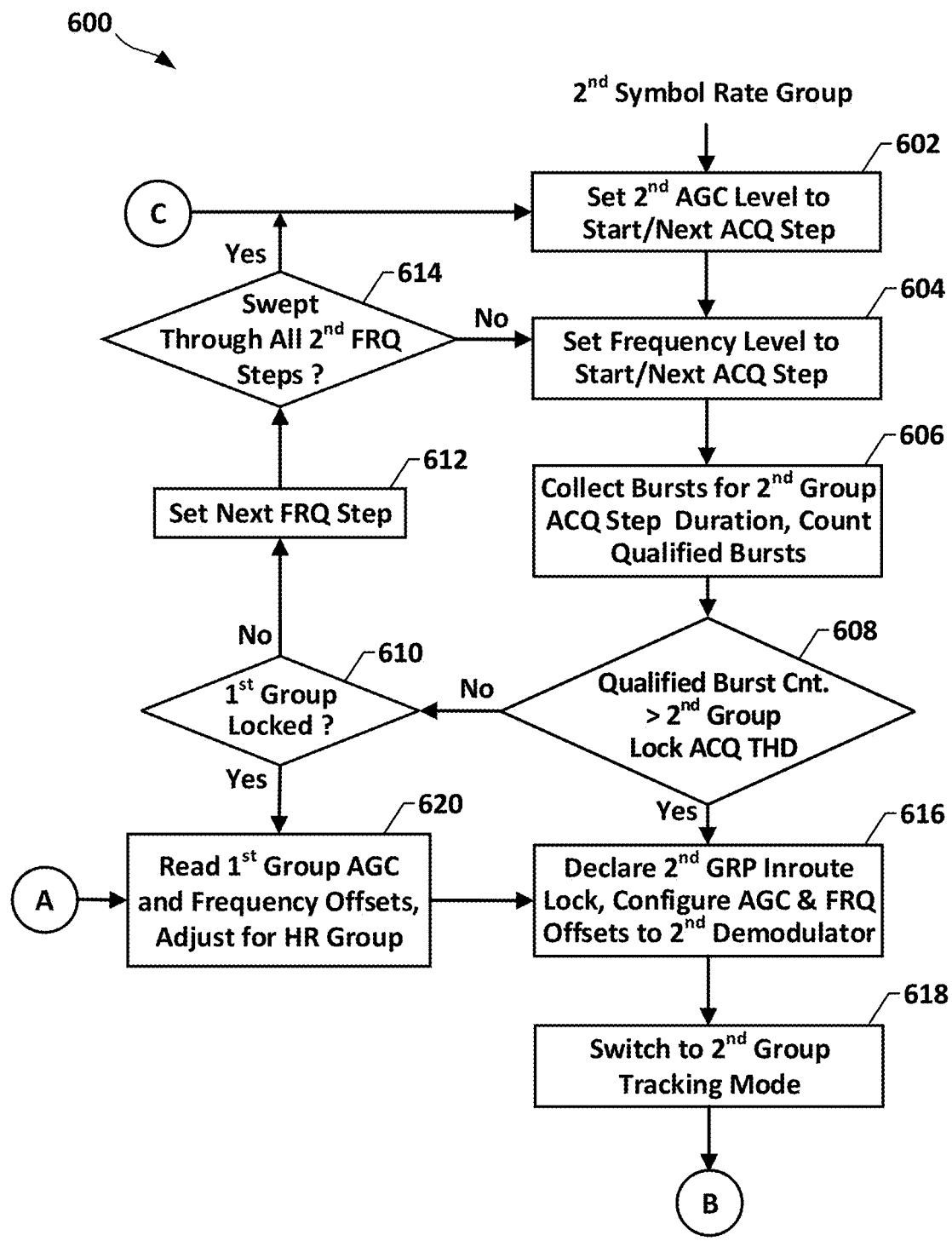
FIG. 6 is a logic flow diagram of example operations in a process of second group acquisition, featuring coupling with processes in first group acquisition and offset tracking, such as shown in FIG. 5, in AGC controlled first group-second group coupled acquisition and offset tracking of high symbol rate inroutes in accordance with this disclosure.
Figure 7:
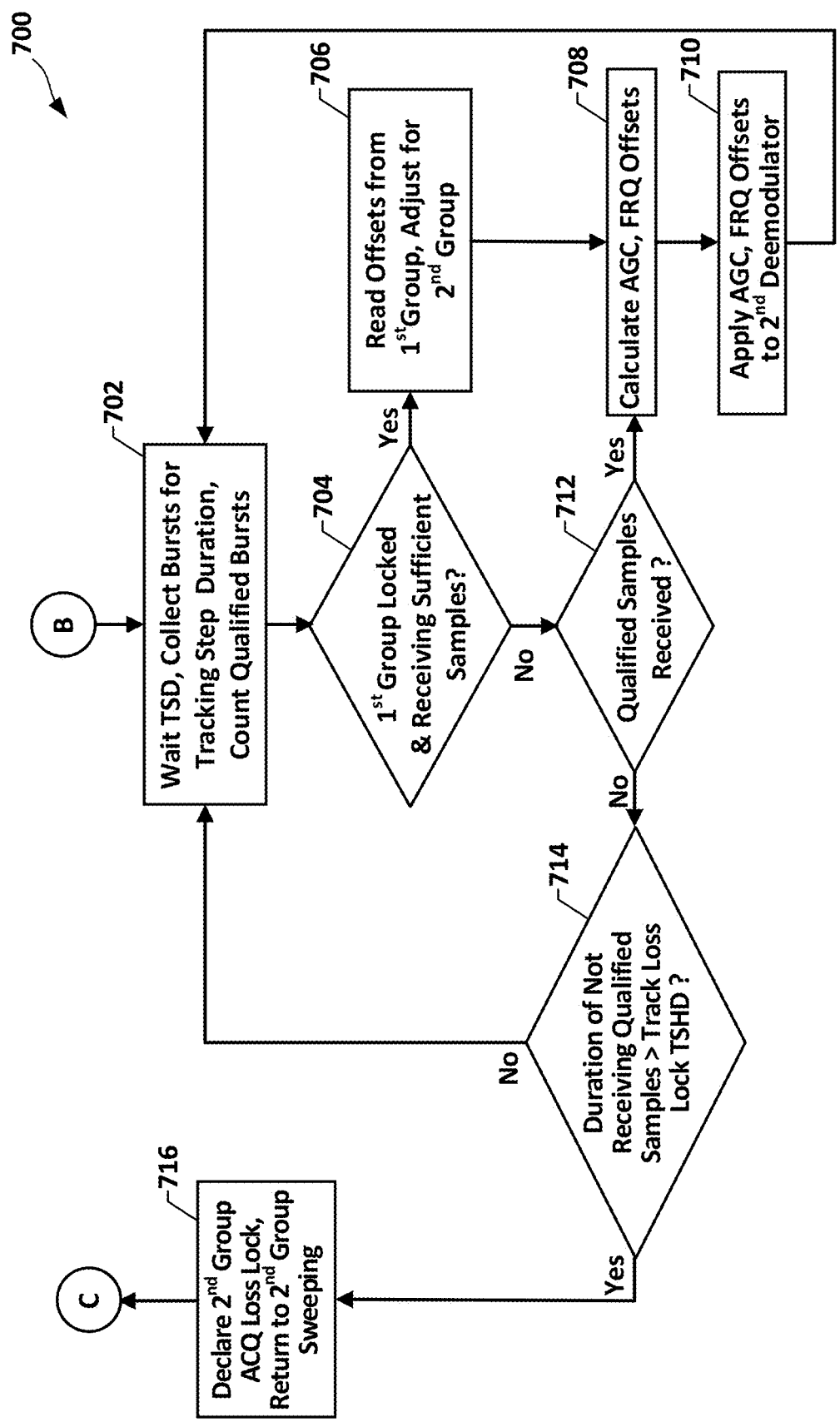
FIG. 7 is a logic flow diagram of example operations in a process of second group offset tracking, featuring coupling with processes in first group offset tracking, such as shown in FIG. 5, in AGC controlled first group-second group coupled acquisition and offset tracking of high symbol rate inroutes in accordance with this disclosure.

FIGS. 5, 6, and 7, in combination, show a logic flow diagram of operations in a process in AGC controlled first group-second group coupled acquisition and offset tracking of high symbol rate inroutes. Connection points between FIGS. 5, 6, and 7 are labeled. FIG. 5 includes flow portion 502 and a flow portion 504. Flow portion 502 shows a flow of operations in an AGC controlled first group acquisition process within the FIGS. 5, 6, and 7 combination. Flow portion 504 shows a flow operations in an AGC controlled first group tracking process within the FIGS. 5, 6, and 7 combination FIG. 6 is a logic diagram of a flow portion 600, which is a flow of operations in an AGC controlled second group acquisition process within the FIGS. 5, 6, and 7 combination. FIG. 7 is a logic diagram of a flow portion 700, which is a flow of operations in an AGC controlled second group tracking with of a flow according to the FIGS. 5, 6, and 7 combination.

Description of one or more example instances according to the combination flow will assume starting from the first group sweeping-second group sweeping state, such as shown in FIG. 2A, e.g., after system reset or extended loss of first and second inroute. Accordingly, for an interval subsequent to the start, the FIG. 5 AGC controlled first group acquisition flow 502 and FIG. 6 AGC controlled second group acquisition flow 600 may be active, and other of the combination flows may be inactive. If, during such activity, the FIG. 5 AGC controlled first group acquisition flow 502 acquires first group offset lock prior to the FIG. 6 AGC controlled second group acquisition flow 600 acquiring second group offset lock, the FIG. 5 AGC first group acquisition flow 502 may indicate first group acquisition lock and go inactive, whereupon FIG. 5 AGC controlled first group tracking flow 502 may go active. This will shift the combination flow to the first group locked-second group sweeping state, such as shown in FIG. 2C. This, in turn, because of actions as described above in reference to the FIG. 1 first acquisition logic 102 generation of FLI, and the resulting override of the second acquisition logic 104 sweep that forces logic 104 FIG. 6 AGC controlled flow 600 to indicate second group acquisition lock, thereby automatically shifting the combination flow to the first group locked-second group locked state as shown in FIG. 2D.

Description will generally address the FIG. 5 AGC first group acquisition flow portion 502 and FIG. 6 AGC controlled second group acquisition flow portion 600 in sequence, followed by FIG. 5 AGC controlled first group tracking flow portion 504, and FIG. 7 controlled second group tracking flow portion 700

An example instance of the AGC controlled first group acquisition flow 502 can begin at 506 where operations can set the first group AGC to a starting level, and then proceed to 508 where operations can initialize or set the first group acquisition frequency to a starting value, e.g., a starting FFO. The flow 500 can proceed from 508 to 510 where, in an aspect, operations can include delaying start of sampling for a time interval. For purposes of description, the timer interval will be referred to as "first acquisition duration." Operations at 510 can include counting qualified first group acquisition bursts. The flow 500 can then proceed from 510 to 512 and apply operations determining whether the qualified burst count collected at 510 meets a first group acquisition lock threshold, therefore detects at this step of the sweep whether there has been first group acquisition lock. Assuming that, at this step, the answer at 512 is "No," the flow 502 can proceed to 514 where operations can increment FFO to the next frequency step. The amount by which the FFO is incremented can be based, for example, on a desired or specified granularity. After incrementing FFO at 514, the flow 502 can proceed to the logic steering gate 516 and determine whether the current increment of FFO is the last sweep step, for the first group AGC level that was set at 506. If the answer at 516 is "No," the flow 502 can proceed to 508, increment the FFO another step and repeat the above described conditional loop of 510 to 512. In an instance where the answer at 516 is "Yes," the flow 502 can return to 504, increase the first group AGC level, then to 508 to start another sweep.

Assuming operations at 512 determine the qualified burst count collected at 510 meets the first group acquisition lock threshold, the flow 502 can proceed to 518 where operations can include declaring first group acquisition lock, computing or configuring first group AGC and locked FFO for the first demodulator, and then to 520 to switch the first group to first group AGC tracking mode. Upon switching to AGC first group tracking mode, operations can be performed according to AGC controlled first group tracking flow 504. Associated with switching to AGC controlled first group tracking mode, the flow 502 can provide the locked FFO and first group AGC to block 534 of the AGC controlled first group tracking flow 504, as initial locked FFO and first group AGC for subsequent updating, as will be described in greater detail.

An example instance of AGC controlled first group tracking flow 504 can begin at 522 where operations can include collecting first demodulator output samples, for example, in accordance with defined sampling parameters, and applying burst sampling and counting. The flow 504 can then proceed to 524 to detect whether the samples indicate first group tracking lock. Assuming the sampling and counting at 522 indicate first group tracking lock, the flow 504 can proceed to 526 to calculate updated locked FFO and locked first group AGC, and then to 528 to apply the calculated locked FFO and locked first group AGC to the first group demodulator. The flow 504 can then proceed from 528 back to 522, and repeat 522, 524, 526 and 528 until an iteration determines, at 524, that the samples collected at 522 do not indicate first group tracking lock. As shown in FIG. 5, associated with each iteration of 522, 524, 526 and 528, the updated locked FFO and locked first group AGC calculated at 526 can be provided to block 534, as the current values of the locked FFO and locked first group AGC. As described above in reference to flow portion 502, block 534 can be initialized with the values generated by first group acquisition block 518.

As described above, blocks 522, 524, 526, and 528 can be repeated until it is determined, at 524, that the samples collected at 522 do not indicate first group tracking lock. In an implementation, instead of such determination at 504 being determined as loss of first group tracking lock, the flow 504 can proceed from the "No" outbranch of 524 to 530 where a determination can be made as to whether the duration of the loss of first group tracking lock detected at 524 exceeds a first group tracking loss threshold. This can avoid short duration dropouts causing unnecessary switch back to the first group acquisition flow 502. Assuming for this iteration that operations at 530 determine the duration of the failure detected at 524 has not yet exceeded a first group tracking loss threshold, the flow 504 can repeat blocks 522 and 524. The repeating of blocks 522 and 524 can continue until an indication at 524 of first group tracking lock, or a determination at 530 that the duration of 524 not indicating first group tracking lock exceeds the first group tracking loss threshold, whichever occurs first. If indication at 524 of first group tracking lock occurs first, the duration is set to zero, the flow 504 proceeds from the "No" outbranch of 530 and the above-described sequence starting at 522 is repeated. If indication at 530 of the first group tracking lock exceeding the first group tracking loss threshold occurs first, the flow 504 can proceeds from the "Yes" outbranch of 530 to 532, where operations can declare loss of first group tracking lock and can return from the flow 504 back to the first group acquisition flow 502.

FIG. 6 is a logic flow diagram of a flow 600 of operations in a process of second group acquisition. As will be described, operations in the flow 600 can couple with the flow 502 of AGC controlled first group acquisition. An instance of the AGC controlled second group acquisition flow 600 can begin at 602 where operations can initialize second group AGC to a starting level, then proceed to 604 where operations, assuming this is a first iteration of the 600, can initialize a second group sweep offset SFO. Upon initializing SFO, the flow 600 can proceed to 602 where operations can collect bursts for a second group acquisition step duration and count the collected qualified bursts. For this iteration it will be arbitrarily assumed that the count at 606 does not meets a second group acquisition lock threshold. This can be due to the current SFO not yet placing the second group NCO within the capture range of the second group demodulator. Accordingly, as shown by the "No" outbranch of flow control block 608, the flow 600 can proceed to flow control block 610, where operations can detect whether first group acquisition lock is indicated and depending on the detection result can proceed from the block's "Yes" outbranch or "No" outbranch. It will be understood that operations at 608 and 610 can combined. The blocks are shown separate only for purposes of description.

Continuing with the example above, it will be assumed for this iteration that the first group acquisition lock is not yet indicated. Accordingly, as shown by the "No" outbranch of flow control block 610, the flow 600 can proceed to 612 where SFO can be incremented to a next frequency step, if any remain, and then to 614 which determines the next step based on whether or not the sweep has spanned all SFO steps. Assuming for this iteration that SFO steps remain, the flow 600 can proceed from the "No" outbranch of 614 to 604 and send to the second group demodulator an SFO value incremented by one step. The flow 600 can then repeat the 606, 608, 610, 612, and 614 loop until the answer at 608 is "Yes" or the answer at 610 is "Yes," whichever occurs first. Either 608 or 610 being "Yes" can effectively be a second group acquisition lock condition. Stated differently the answer at 608 being "Yes" is one second group acquisition lock condition and the answer at 610 being "Yes" is another second group acquisition lock condition.

Assuming for this iteration that the first to occur among a "Yes" at 608 and a "Yes" at 610 is a "Yes" at 608. In other words, the preceding incrementing of SFO placed the second group NCO within the capture range of the second group demodulator. Accordingly, the flow 600 can proceed from the "Yes" outbranch of flow control block 608 to 616 where operations can include declaration of second group acquisition lock, providing or indicating the current SFO as a locked SFO and the current AGC as a locked second group AGC. The flow 600 can then proceed to 618, where the second group flow shown by FIGS. 6 and 7 can proceed to the FIG. 7 AGC controlled second group tracking flow 700.

The above description assumed that the second group acquisition resulted from an incrementing of SFO at 604 placing the second group NCO within the capture range of the second group demodulator. Description will now assume that the first group acquisition lock was detected at 610 prior to incrementing SFO at 604 placing the second group NCO within the capture range of the second group demodulator. Accordingly, the flow 600 can proceed from the "Yes" outbranch of block 610 to 620, where operations can include reading the first group locked AGC value and locked FFO value and adjusting the read locked AGC value and adjusting the locked FFO value, to a second group compatible locked SFO and locked AGC. The flow 600 can then proceed to 618 as described above.

The above description also assumed that a "Yes" at 608 or a "Yes" at 610 occurred prior to operations at 614 detecting that all of the SFO frequency step had been swept. Assuming such occurrence the flow 600 can proceed from the "Yes" outbranch of flow control block 614 to 602, where operations can increment the second group AGC, and can then repeat the above-described second group acquisition process according to the flow 600.

As seen from FIG. 6, features of the flow 600 can include initialize the value of the SFO at a sweep starting second frequency, then then incrementing SFO offset until meeting what can be termed a second group sweep stop condition. The second group sweep stop condition can be among a plurality of second group sweep stop conditions. One can be a detection at 608 of detecting qualifying second acquisition pattern in the samples collected at 606. Another can be a detection at 610 of first group acquisition lock.

FIG. 7 is a logic flow diagram of a flow 700, of operations in a process of AGC controlled second group offset tracking, featuring coupling with processes in first group offset tracking, such as described above in reference to FIG. 5 flow portion 504.

An example instance of the AGC controlled second group tracking flow 700 can begin at 702 where operations can include collecting second demodulator output samples and deriving or extracting certain parameters, e.g., burst counting parameters. In an aspect, flow 700 can proceed from 702 to 704 where, instead of immediately determining whether the sampling at 702 indicates second group acquisition lock, operations can determine whether the FIG. 5 AGC controlled first group tracking flow 504 indicates presence or absence of first group tracking lock. In an implementation, if the answer at 704 is "Yes," the flow 700 can proceed to 706 where operations can read or otherwise obtain the most recent first group offsets, e.g., most recent FFO stored at FIG. 5 block 534 and adjust the read FFO and first group AGC values to be usable for the second group demodulator. The flow 700 can then proceed to 708, where operations can compute second group updated offsets, e.g., updated SFO and updated second group AGC, and then to 710 to apply the updated SFO and updated second group ACG to the second demodulator. The flow 700 can then proceed back to 702 and repeat the above-described sequence 702, 704, 706, 708, and 710 until operations at 704 do not indicate first group tracking lock.

Assuming such an instance, the flow 700 can proceed from the "No" outbranch of block 704 to 712, where operations can determine whether the second demodulator samples obtained at 702 meet criteria establishing second group tracking lock. If the answer at 712 "Yes," the flow 700 can proceed directly to 708 and compute updated SFO and updated second group AGC and proceed from 708 as described above. If the answer at 712 is "No," the flow 700 can proceed from the "No" outbranch of 712 to 714 where a determination can be made as to whether the duration of the loss of first group tracking lock detected at 712 exceeds a second group tracking loss threshold. Assuming for this iteration that operations at 714 determine the duration of the failure detected at 712 has not yet exceeded a second group tracking loss threshold, the flow 700 can return to 702 and proceed as described above. If operations at 714 determine the duration of the failure detected at 712 exceeded the second group tracking loss threshold, the flow 700 can proceed from the "Yes" outbranch of 714 to 716, where operations can declare loss of second group tracking lock and can return from the flow 700 back to the FIG. 6 second group acquisition flow 600.

Figure 8:
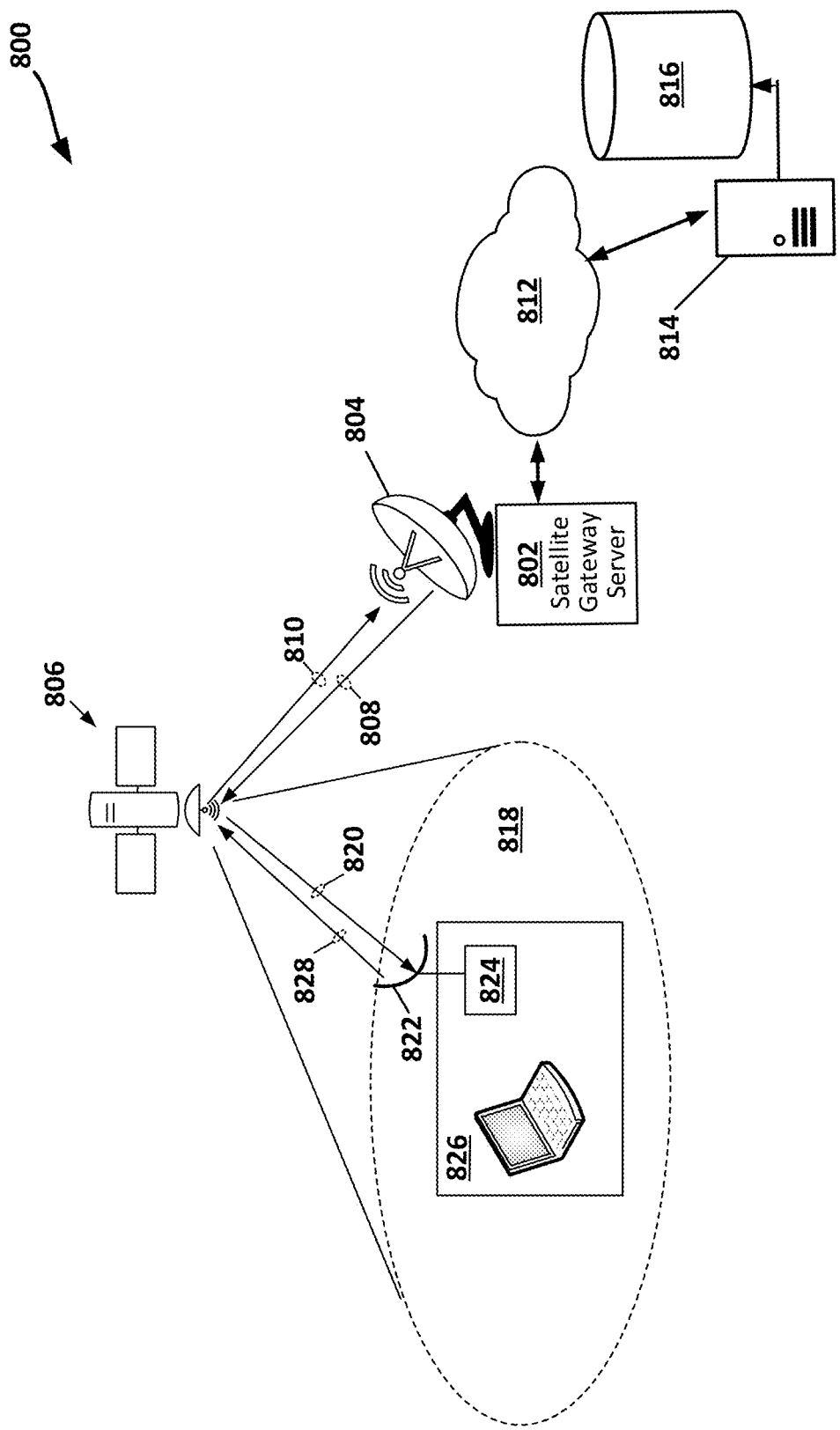
FIG. 8 is a high level functional block diagram of a satellite communication system in and on which first systems and methods of group-second group coupled acquisition and offset tracking of high symbol rate inroutes can be implemented in accordance with this disclosure

FIG. 8 is a high level logical, schematic of an example very small aperture satellite (VSAT) system 800 (hereinafter "system 800") in or on which implementations according to this disclosure can be supported. The system 800 can include a satellite gateway server 802, having a radio frequency terminal (RFT) with satellite dish 804, connected to orbital satellite 806 by forward uplink 808 and reverse downlink 810. The orbital satellite 806 can be, for example, a spaceborne High Throughput Satellite (HTS), and can be configured to transmit data content items, for example, received via wide area network (WAN) 812 from server stack 814 with database 816, to remote sites via a plurality of narrowly focused regional spot beams, such as the representative spot beam 818. Each spot beam 818 can define a communication cell, with neighboring cells typically operating at different frequencies and/or polarizations, typically according to a three-color or four-color coloring scheme to allow reuse of frequencies and/or polarizations. The orbital satellite 806 can send packets over forward downlink (FDL) 820 to VSAT dish 822 coupled to a VSAT terminal 824. A user equipment (UE) UE 826 can communicate with the VSAT terminal 824 via, for example, via an access point (not explicitly visible in FIG. 8) which can be wireless Wi-Fi device, wired (e.g., Ethernet) Wi-Fi, or both. The orbital satellite 806 can receive information from the VSAT terminal 824 over reverse uplink (RLU) 828, for communication over the RDL 810 to the satellite gateway server 802.

In some implementations, more than one satellite may be used, or other types of satellites may be used, including, but not limited to, Fixed Satellite Service (FSS) High Throughput Satellite (HTS). In some implementations, orbital satellite 806 can be configured to receive data from one or more gateway stations for retransmission via spot beams to remote sites located within cells defined by the spot beams.

Figure 9:
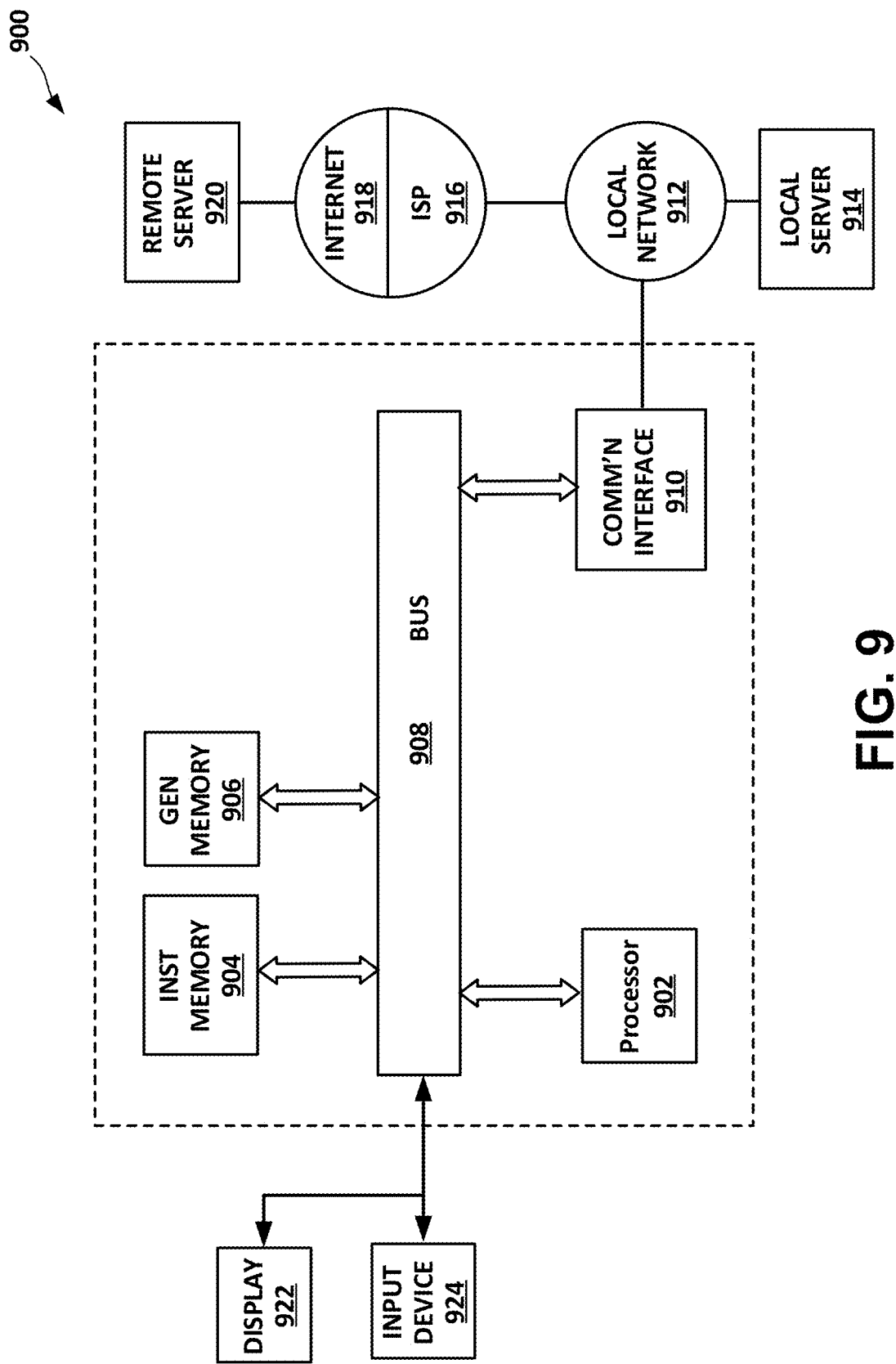
FIG. 9 is a functional block diagram of an example computer system upon which aspects of this disclosure may be implemented.

FIG. 9 is a block diagram illustrating a computer system 900 upon which aspects of this disclosure may be implemented, such as, but not limited to, particular function blocks and processes described in reference to FIGS. 1-7. It will be understood that logic blocks illustrated in FIG. 9 represent functions, and do not necessarily correspond to particular hardware on a one-to-one basis. The computer system 900 can include a data processor 902, instruction memory 904, and a general purpose memory 906, coupled by a bus 908. The instruction memory 904 can include a tangible medium retrievably storing computer-readable instructions, that when executed by the data processor 902 cause the processor to perform functions, processes, and operations described herein, for example, in reference to FIGS. 1, 2A-2D, 3, 4, 5, 6, and 7.

The computer system 900 can include a communications interface 910, configured to interface with a local network 912 for accessing a local server 913, and to communicate through an ISP 914 to the Internet 915, and access a remote server 916. The computer system 900 can also include a display 917 and a user interface or other input device 918, either as separate devices or combined, for example, as a touchscreen display.

The term "machine-readable medium" as used herein refers to any medium that participates in providing data that causes a machine to operation in a specific fashion. Forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirements of Sections 101, 102, or 103 of the Patent Act, nor should they be interpreted in such a way. Any unintended embracing of such subject matter is hereby disclaimed.

Except as expressly stated above, no statement herein is intended or should be interpreted to cause a dedication of any component, step, feature, object, benefit, advantage, or equivalent thereof to the public, regardless of whether it is or is not recited in the claims.

It will be understood that terms and expressions used herein have the ordinary meaning accorded to such terms and expressions in their respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, or apparatus comprising the element.

The Abstract of the Disclosure is provided to allow the reader to quickly identify aspects of the disclosed subject matter. In the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system, comprising:
   a first acquisition logic, configured to acquire a first frequency offset for a first demodulator and correspondingly indicate a first acquisition lock, wherein acquiring the first frequency offset includes sweeping a value to the first demodulator for the first frequency offset and correspondingly monitoring an output of the first demodulator for detection of a qualifying first acquisition pattern, and in response to detecting the qualifying first acquisition pattern, to set a locked first frequency offset and indicate first acquisition lock;
   a second acquisition logic, configured to acquire a second frequency offset for a second demodulator, wherein acquiring the second frequency offset includes sweeping a value for the second frequency offset and correspondingly periodically monitoring an output of the second demodulator for detection of a qualifying second symbol pattern and, in response to a conjunction of the indication of first acquisition lock and not detecting the qualifying second acquisition pattern, to set a locked second frequency offset and indicate second acquisition lock;
   a first tracking logic, configured to periodically determine whether a first tracking condition is met by the output of the first demodulator and, based at least in part on the first tracking condition being met, to indicate first tracking lock and update the locked first frequency offset; and
   a second tracking logic, configured to periodically determine whether a second tracking condition is met and, based at least in part on meeting the second tracking condition, to indicate second tracking lock and update the locked second frequency offset.

2. The system of claim 1, wherein:
   the second tracking logic is configured such that the second tracking condition is met by the indication of first tracking lock and is further configured such that, in response to the second tracking condition being met by the indication of first tracking lock, the second tracking logic includes in updating the locked second frequency offset includes a computing of an adjusted current locked first frequency offset and a computing, based at least in part on the adjusted current locked first frequency offset, of the updated locked second frequency offset.

3. The system of claim 2, wherein the second tracking logic is further configured to periodically determine whether there is indication of first tracking lock, and, in response to determining there is no indication of first tracking lock, to:
   determine whether a second tracking condition is met by the output of the second demodulator and, in response to the second tracking condition being met, to compute the updated locked second frequency offset based at least in part on the output of the second demodulator.

4. The system of claim 3, wherein the second tracking logic is further configured to:
   include in determining whether the second tracking condition is met by the output of the second demodulator a determining of whether the second tracking condition is not met, and
   indicate loss of second group acquisition lock in response to determining the second tracking condition is not met.

5. The system of claim 2, wherein:
   the first offset tracking logic is further configured to indicate, based at least in part on an instance of the periodic determining whether the first tracking condition is met being a determination that the first tracking condition is not met, a loss of first tracking lock, and
   the second tracking logic is further configured to indicate, in response to a conjunction of determining the second tracking condition is not met by the output, and the loss of first tracking lock, loss of second tracking lock.

6. The system of claim 1, wherein the second acquisition logic is further configured to determine, in response to instances of the periodic monitoring of the output of the second demodulator detecting no qualifying second symbol pattern, whether there is first acquisition lock and, in response to determining there is first acquisition lock to:
   compute an adjusted locked first frequency offset and, based at least in part on the adjusted locked first frequency offset, to compute a value for the locked second frequency offset.

7. The system of claim 1, wherein the second offset acquisition logic is further configured to:
   initialize the value of the second frequency offset at a sweep starting second frequency, then increment the second frequency offset until meeting a sweep stop condition,
   wherein:
   the sweep stop condition is among a plurality of sweep stop conditions, which include a first sweep stop condition, a second sweep stop condition, and a third sweep stop condition, the first sweep stop condition being a reaching of a sweep ending second frequency, the second sweep stop condition being detection of the qualifying second acquisition pattern, and the third sweep stop condition being the indication of first acquisition lock.

8. The system of claim 7, wherein initializing the value of the second frequency offset at the sweep starting second frequency is a first initialization and the second offset acquisition logic is further configured to:
  initialize, in association with the first initialization, an AGC (automatic gain control) for the first demodulator to an initial AGC setting; and
  respond to the first sweep stop condition by updating the setting of the AGC for the first demodulator, re-initializing the value of the second frequency offset at the sweep starting second frequency, then increment the second frequency offset until another instance of the sweep stop condition.

9. The system of claim 1, wherein the system further comprises a state logic, the state logic being configured to switch, based at least in part on the indication of first acquisition lock, indication of second acquisition lock, indication of first tracking lock, and indication of second tracking lock, among a plurality of different states, the plurality including
  a first state, the first state being a first group sweeping-second group sweeping state;
  a second state, the second state being a first group locked-second group sweeping state;
  a third state, the third state being a first group sweeping-second group locked state; and
  a fourth state, the fourth state being a first group locked-second group locked state,
  wherein:
  the first group sweeping-second group sweeping state includes the first acquisition logic sweeping the value of the first frequency offset absent indication of first acquisition lock in combination with the second acquisition logic sweeping the value of the second frequency offset absent indication of second acquisition lock,
  the first group locked-second group sweeping state includes the first tracking logic currently indicating first tracking lock and updating the locked first frequency offset, in combination with the second acquisition logic sweeping the value of the second frequency offset absent indication of second acquisition lock in conjunction with absence of indication of second tracking lock,
  the first group sweeping-second group sweeping state includes the first acquisition logic sweeping the value of the first frequency offset absent indication of first acquisition lock in conjunction with absence of indication of second tracking lock, in combination with the second tracking logic currently indicating second tracking lock and updating the locked second frequency offset, and
  the first group locked-second group locked state includes the first tracking logic currently indicating first tracking lock and updating the locked first frequency offset, in combination with the second tracking logic currently indicating second tracking lock and updating the locked second frequency offset.

10. A method, comprising:
  acquiring a first frequency offset for a first demodulator, wherein acquiring the first frequency offset includes sweeping a value to the first demodulator for the first frequency offset, correspondingly monitoring an output of the first demodulator for a qualifying first acquisition pattern and, based at least in part of detecting the qualifying first acquisition pattern, indicating first acquisition lock and setting the first frequency offset;
  acquiring a second frequency offset for a second demodulator, wherein acquiring the second frequency offset includes sweeping a value for the second frequency offset, correspondingly monitoring an output of the second demodulator for detection of a qualifying second symbol pattern and, in response to a conjunction of the indication of first acquisition lock and not detecting the qualifying second acquisition pattern, setting a locked second frequency offset and indicating second acquisition lock;
  periodically determining whether a first tracking condition is met by the output of the first demodulator and, based at least in part on the first tracking condition being met, indicating first tracking lock and updating the locked first frequency offset; and
  periodically determining whether a second tracking condition is met and, based at least in part on meeting the second tracking condition, indicating second tracking lock and updating the locked second frequency offset.

11. The method of claim 10, wherein:
  the second tracking condition is met by the indication of first tracking lock, and
  in response to the second tracking condition being met by the indication of first tracking lock, updating the locked second frequency offset includes a computing of an adjusted current locked first frequency offset and a computing, based at least in part on the adjusted current locked first frequency offset, of the updated locked second frequency offset.

12. The method of claim 11, wherein the method further includes periodically determining whether there is indication of first tracking lock, and, in response to determining there is no indication of first tracking lock,
  determining whether a second tracking condition is met by the output of the second demodulator and, in response to the second tracking condition being met, computing the updated locked second frequency offset based at least in part on the output of the second demodulator.

13. The method of claim 12, wherein determining whether the second tracking condition is met by the output of the second demodulator includes determining whether the second tracking condition is not met, and wherein the method further comprises:
  indicating loss of second group acquisition lock in response to determining of the second tracking condition is not met.

14. The method of claim 11, wherein the method further comprises:
  indicating, based at least in part on an instance of the periodic determining whether the first tracking condition is met being a determination that the first tracking condition is not met, a loss of first tracking lock; and
  in response to determining the second tracking condition is not met by the output, in conjunction with the loss of first tracking lock, indicating loss of second tracking lock.

15. The method of claim 10, wherein the method further comprises:
  determining, in response to instances of the periodic monitoring of the output of the second demodulator detecting no qualifying second symbol pattern, whether there is first acquisition lock; and in response to determining there is first acquisition lock, computing an adjusted locked first frequency offset, and based at least in part on the adjusted locked first frequency offset, computing a value for the locked second frequency offset.

16. The method of claim 10, wherein the method further comprises:

initializing the value of the second frequency offset at a sweep starting second frequency, then incrementing the second frequency offset until meeting a sweep stop condition, wherein:

the sweep stop condition is among a plurality of sweep stop conditions, which include a first sweep stop condition, a second sweep stop condition, and a third sweep stop condition, the first sweep stop condition being a reaching of a sweep ending second frequency, the second sweep stop condition being detection of the qualifying second acquisition pattern, and the third sweep stop condition being the indication of first acquisition lock.

17. The method of claim 16, wherein initializing the value of the second frequency offset at the sweep starting second frequency is a first initializing, and wherein the method further comprises:

initializing, in association with the first initialization, an AGC (automatic gain control) for the first demodulator to an initial AGC setting; and responding to the first sweep stop condition by updating the setting of the AGC for the first demodulator, re-initializing the value of the second frequency offset at the sweep starting second frequency, then incrementing the second frequency offset until another instance of the sweep stop condition.

18. The method of claim 10, wherein the method further includes switching states, based at least in part on the indication of first acquisition lock, indication of second acquisition lock, indication of first tracking lock, and indication of second tracking lock, among:

a first state, the first state being a first group sweeping-second group sweeping state;

a second state, the second state being a first group locked-second group sweeping state;

a third state, the third state being a first group sweeping-second group locked state; and a fourth state, the fourth state being a first group locked-second group locked state, wherein:

the first group sweeping-second group sweeping state includes sweeping the value of the first frequency offset absent indication of first acquisition lock in combination with sweeping the value of the second frequency offset absent indication of second acquisition lock, the first group locked-second group sweeping state includes currently indicating first tracking lock and updating the locked first frequency offset, in combination with sweeping the value of the second frequency offset absent indication of second acquisition lock in conjunction with absence of indication of second tracking lock, the first group sweeping-second group sweeping state includes sweeping the value of the first frequency offset absent indication of first acquisition lock in conjunction with absence of indication of second tracking lock, in combination with currently indicating second tracking lock and updating the locked second frequency offset, and the first group locked-second group locked state includes currently indicating first tracking lock and updating the locked first frequency offset, in combination with currently indicating second tracking lock and updating the locked second frequency offset.

19. A system, comprising: a processor; and a memory, coupled to the processor, that stores executable instructions that, when executed by the processor, cause the processor to:

acquire a first frequency offset for a first demodulator, wherein acquiring the first frequency offset includes sweeping a value for a first frequency offset to the first demodulator, correspondingly monitoring an output of the first demodulator for a qualifying first acquisition pattern and, based at least in part on detecting the qualifying first acquisition pattern, indicating first acquisition lock and setting a locked first frequency offset;

acquire a second frequency offset for a second demodulator, wherein acquiring the second frequency offset includes sweeping a value for a second frequency offset, and correspondingly monitoring an output of the second demodulator for a qualifying second symbol pattern and, in response to a conjunction of the indication of first acquisition lock and not detecting the qualifying second acquisition pattern, to set a locked second frequency offset and indicate second acquisition lock;

periodically determine whether a first tracking condition is met by the output of the first demodulator and, based at least in part on the first tracking condition being met, to indicate first tracking lock and update the locked first frequency offset; and periodically determine whether a second tracking condition is met and, based at least in part on meeting the second tracking condition, to indicate second tracking lock and update the locked second frequency offset.

20. The system of claim 19, wherein:

the second tracking condition is any among two second tracking conditions, one of the two second tracking conditions is the indication of first tracking lock, and in response to the second tracking condition being met being the indication of first tracking lock, updating the locked second frequency offset includes a computing of an adjusted current locked first frequency offset, and a computing, based at least in part on the adjusted current locked first frequency offset, of the updated locked second frequency offset.

* * * * *